United States Patent
Cota

(10) Patent No.: US 10,821,410 B2
(45) Date of Patent: Nov. 3, 2020

(54) DEVICE FOR FILLING A TUBE WITH PARTICULATE FILLING MATERIAL

(71) Applicant: Aldo Cota, Manching (DE)

(72) Inventor: Aldo Cota, Manching (DE)

(*) Notice: Subject to any disclaimer, the term of this patent is extended or adjusted under 35 U.S.C. 154(b) by 0 days.

(21) Appl. No.: 16/072,776

(22) PCT Filed: Jan. 26, 2017

(86) PCT No.: PCT/EP2017/051671
§ 371 (c)(1),
(2) Date: Jul. 25, 2018

(87) PCT Pub. No.: WO2017/129689
PCT Pub. Date: Aug. 3, 2017

(65) Prior Publication Data
US 2019/0030505 A1 Jan. 31, 2019

(30) Foreign Application Priority Data
Jan. 28, 2016 (EP) ..................................... 16153078

(51) Int. Cl.
*B01J 8/00* (2006.01)
*B01J 8/06* (2006.01)
*B65G 69/16* (2006.01)

(52) U.S. Cl.
CPC .............. *B01J 8/002* (2013.01); *B01J 8/003* (2013.01); *B01J 8/0045* (2013.01); *B01J 8/06* (2013.01);
(Continued)

(58) Field of Classification Search
CPC ...... B01J 8/002; B01J 8/003; B01J 8/06; B01J 2208/00752; B01J 2208/00769;
(Continued)

(56) References Cited

U.S. PATENT DOCUMENTS 3,348,647 A * 10/1967 Gates .................... A01D 45/006
193/7
3,608,751 A * 9/1971 Hundtofte ................ B01J 8/003
414/287
(Continued)

FOREIGN PATENT DOCUMENTS

EP 0548999 A1 6/1993
EP 1749568 A1 2/2007
(Continued)

OTHER PUBLICATIONS

International Preliminary Report on Patentability issued in PCT/EP2017/051671 dated Jun. 4, 2018.
(Continued)

*Primary Examiner* — Timothy L Maust
*Assistant Examiner* — James R Hakomaki
(74) *Attorney, Agent, or Firm* — Saul Ewing Arnstein & Lehr LLP; Brian R. Landry; Leah Mae Octavio

(57) ABSTRACT

A device for gently and uniformly filling a tube, in particular a tubular reactor, with particulate filling material, in particular catalyst particles; wherein the device includes specially designed fall arrester elements and also comprises deflectors that reduce the wear of the fall arrester elements. Another aspect of the invention provides a method for filling a tube using these articles.

15 Claims, 15 Drawing Sheets

(52) U.S. Cl.
CPC ..... *B65G 69/16* (2013.01); *B01J 2208/00752* (2013.01); *B01J 2208/00769* (2013.01); *B01J 2208/00778* (2013.01); *B01J 2208/06* (2013.01)

(58) Field of Classification Search
CPC ............ B01J 8/0045; B01J 2208/00778; B01J 2208/06; B65G 69/16
USPC .......................................................... 141/100
See application file for complete search history.

(56) References Cited

U.S. PATENT DOCUMENTS

| | | | | |
|---|---|---|---|---|
| 5,192,132 | A | * | 3/1993 | Pelensky ................. B01J 8/003 136/230 |
| 6,467,513 | B1 | | 10/2002 | Yanaru et al. |
| 2007/0215236 | A1 | | 9/2007 | Brennom |
| 2008/0149215 | A1 | * | 6/2008 | Patureaux ............ B65G 11/066 141/1 |
| 2009/0145727 | A1 | * | 6/2009 | Johns ....................... B01J 8/002 198/617 |

FOREIGN PATENT DOCUMENTS

| | | |
|---|---|---|
| EP | 1752210 A1 | 2/2007 |
| EP | 2191889 A1 | 6/2010 |
| WO | 2004096428 A1 | 11/2004 |
| WO | 2011012875 A1 | 2/2011 |
| WO | 2016176604 A1 | 11/2016 |

OTHER PUBLICATIONS

International Search Report and Written Opinion of the International Searching Authority issued in PCT/EP2017/051671 dated Apr. 3, 2017.

* cited by examiner

DEVICE FOR FILLING A TUBE WITH PARTICULATE FILLING MATERIAL

CROSS-REFERENCE TO RELATED APPLICATIONS

This application is the U.S. national phase, pursuant to 35 U.S.C. § 371, of PCT international application Ser. No. PCT/EP2017/051671, Jan. 26, 2017, designating the United States and published in German on Aug. 3, 2017 as publication WO 2017/129689 A1, which claims priority under 35 U.S.C. § 119(a) to European patent application No. 16153078.7, filed Jan. 28, 2016. The entire disclosures of the aforementioned patent applications are hereby incorporated herein by reference.

The present invention relates to a device for gently and uniformly filling a tube, in particular a tubular reactor, with particulate filling material, in particular catalyst particles; wherein the device comprises specially designed fall arrester elements and also comprises means which reduce the wear of the fall arrester elements; and method for filling a tube using these articles.

BACKGROUND OF THE INVENTION

For carrying out chemical reactions in tubular reactors filled with catalyst particles, the quality of the catalyst filling is very important. A homogeneous catalyst bed ensures a uniform temperature distribution in the reactor. When the catalyst particles, which are frequently very sensitive mechanically, are poured in, particles can break up on account of excessive mechanical force application or catalyst mass can be abraded. As a result, the catalyst filling is compacted and causes undesired pressure losses when the reactor is operated. In the case of nonuniform filling, there is also the risk of the formation of what are known as "hot spots", i.e. zones of undesirably high temperature in the reactor, which impair the control of the reaction process. When tubular reactors are filled with catalyst particles, particular attention therefore has to be paid to the homogeneity of the bed obtained. Attempts are made to achieve this by filling the tube with the catalyst particles as gently as possible.

EP-A-0 548 999 discloses a method for filling vertical tubes with particulate material, in which a line is introduced into the tube, said line bearing radial arresting means, in the form of flexible brushes, arranged transversely to the line, the radial extent of said brushes being less than the radius of the tube. These brushes yield gradually when particles fall thereon. The line is pulled upward out of the tube during filling.

This device known from the prior art has serious drawbacks in practice. In particular, the radial arrangement of the straight, short bristles of the arresting means frequently causes undesired faults during the filling operation. This is because the arresting means is not permeable to the catalyst particles, in particular in the central region, i.e. close to the line, on account of the high bristle density and so, in particular at too high a filling rate, fewer particles pass downward through the arrester element than are charged from above. As a result, clogging of the tube frequently occurs and, as a result, tearing of the carrier cable. In order to remedy this fault, the filling operation has to be interrupted and catalyst that has already been poured in sucked out again, with the result that the entire operation is unnecessarily retarded and the downtime of the plant is unnecessarily extended. If the filling operation is not carried out continuously, this can also impair the homogeneity of the particle bed.

A further device for filling tubes with catalyst particles is described in U.S. Pat. No. 6,467,513. Said device comprises a line provided with brush-like arrester elements, which is located in a flexible filling tube. The line is introduced into the reactor to be filled together with the filling tube and is pulled back out of the reactor again together with the filling tube during the filling operation. Overall, in such a device, the handling of the filling tube during filling is particularly awkward and furthermore the filling operation is slowed down unnecessarily thereby. In said document, different arrester elements are also described for this device, in particular brushes with radially protruding arms;

brushes in which metal grating elements are additionally fitted between two adjacent arms and which are thus constructed in a fairly complicated manner; and devices with leaf-shaped, radially arranged arms. However, the manner in which the mentioned grating elements are actually intended to be designed and the manner in which they are intended to be fastened in particular to two adjacent arms without impairing the function of the arrester element is not described. The mesh width of these regularly constructed grating elements is intended to be adaptable to the particle size of the respectively used catalysts. In any case, however, the production of such additional grating elements is complicated and expensive and, furthermore, the elasticity of such arrester elements is undesirably reduced overall as a result.

WO 2004/096428 discloses a further device for filling tubes with catalyst particles, wherein uniformly spaced-apart, longitudinal and substantially rigid fall arresters which are formed in a clip-like manner are clamped asymmetrically to a central line and are directed outward radially and substantially horizontally. The clips are arranged axially along the central line so as to ensure circumferential coverage of the tube cross section. The individual fall arresters do not form a net-like structure. Without providing any more specific information, the possibility is furthermore mentioned therein of attaching a sensor, which is not described in more detail, to the lower end of the line, said sensor transmitting an optical or acoustic signal to the upper end of the line as soon as the lower end comes into contact with the catalyst filling. However, no design details whatsoever are provided. Permanent optical monitoring is also not proposed. A drawback here is that the device can be set into violent rotary motion during filling, with the result that coverage of the tube cross section with arrester elements is no longer reliably ensured and thus fall arresting is not optimal. Homogeneous formation of the deposited catalyst bed therefore cannot be achieved, and at a higher filling rate there is also the risk of the catalyst particles breaking up and thus "hot spots" forming during plant operation.

EP-A-1 749 568 describes a device for filling a tube with particulate filling material, comprising at least one fall arrester element that is fastened to a carrier and is introducible, together with the carrier, into the tube to be filled, wherein the fall arrester element carries a net structure that is permeable to the filling-material particles, wherein the net structure is formed from a multiplicity of elastic net elements. The individual net elements, which may be formed for example from thin steel wires, are fastened to the central body of the fall arrester element rigidly or via spring joints. Therefore, the net structure is exposed to strong mechanical loads in the central region during filling. This is the case in particular when the filling-material particles have outer edges. The strong mechanical loading when such particles strike individual net elements results in this case in increased material fatigue and in the breaking of individual net elements.

Premature replacement of individual entire fall arrester elements and possibly even a relatively long interruption to the filling operation may therefore be necessary. The significant advantages, associated with this type of device, in terms of uniform filling that is gentle on particles are impaired as a result.

Therefore, the object of the present invention is to provide an improved filling device for straight, longitudinal tubes, such as tubular reactors, in particular those with diameters of more than 50 mm, which is even less susceptible to faults and allows even quicker, gentle and uniform filling of the tube with filling material.

SUMMARY OF THE INVENTION

It was possible to achieve the above object in particular by providing an improved filling device which not only has the fall arrester elements comprising a net structure that are known from EP-A-1 749 568, but also additionally has specially designed filling-material deflectors above each fall arrester element.

These filling-material deflectors are configured such that they protect the central region, which is subjected to the greatest mechanical load, of a fall arrester element, or the central region of the corresponding net structure, and in particular the inner portion of the individual net elements, via which the latter are fastened to the body of the fall arrester element, from being struck directly by filling-material particles, but, on the other hand, do not significantly slow down the filling rate or even cause clogging of the tubular reactor with filling material during the filling operation.

The falling speed of the filling material is, according to the invention, effectively reduced and, moreover, in the configuration according to the invention of the device, even at a high filling rate, clogging of the tube to be filled does not occur. Surprisingly, it has been found that when a loose, flexible and irregular net structure made up of one or more flexible, curved net elements in combination with such filling-material deflectors is used, fault-freer and gentle filling of a tube with particulate filling material becomes possible. Specifically, according to the invention, it has in particular been observed that, as a result of the configuration according to the invention of the fall arrester element in combination with a central filling-material deflector arranged thereabove, the filling-material particles are distributed, or scattered, quickly over the tube cross section during the filling operation, clogging is effectively prevented by this relatively disordered movement, and at the same time the net elements, or fall arrester elements have a greatly improved service life.

DESCRIPTION OF THE FIGURES

FIG. 6 d), e) and f) show net elements which are able to be fastened to the fall arrester element via spring joints (407), specifically d) a fiber (405), e) a loop (406) having two terminal spring joints (407), and f) a multiply curved zigzag fiber (408).

FIG. 8 shows a further configuration of fall arrester elements according to the invention. The net elements, in this case loops (406) having spring joints (407), are carried by a two-part sleeve-like metal body consisting of two body halves (360, 361) that are able to be screwed together. The spring joints are in this case inserted into lateral depressions or recesses (362) that are distributed radially around the circumference of the body halves. The inside diameter of the sleeve-like body is adapted to the diameter of the carrier, in this case of the light guide (50), such that when the two body halves are screwed together, the body is fixed to the light guide (50) in a form-fitting manner.

FIG. 9 shows further configurations of fall arrester elements according to the invention. A one-piece metal body (330) is provided with a screw thread (331) at each of its top and bottom ends. Via this screw thread (331), it is able to be connected to the carrier (2) (not illustrated). Provided around the entire circumference of the central portion of the body (330) are a plurality of depressions or recesses (332), which are configured such that the net elements, produced for example from individual pieces of steel wire, are able to be fixed therein, said net elements together forming a three-dimensional net. In particular, depressions (332) are provided here which can receive the spring joints (407). The spring joints (407) project out of the depressions (332) to such an extent that an improved spring action is ensured.

FIG. 11 shows different configurations of umbrella-like filling-material deflectors (10) according to the invention. Illustrated on the left in each case is a perspective view, and illustrated to the right thereof is the cross section through the respective filling-material deflector.

FIG. 12 shows two further configurations of filling-material deflectors (10e and 10f) that are usable according to the invention. FIG. 12b, by contrast, shows a multipart filling-material deflector (10f) that is formed from straight bristles directed radially and obliquely downward in the filling direction. The bristles are joined together at their top ends by means of a metal ring. Via the openings (12) therein, the two filling-material deflectors (10e, 10f) are able to be fastened to the body of the fall arrester element, for example as shown in FIG. 10a.

Figure 1:
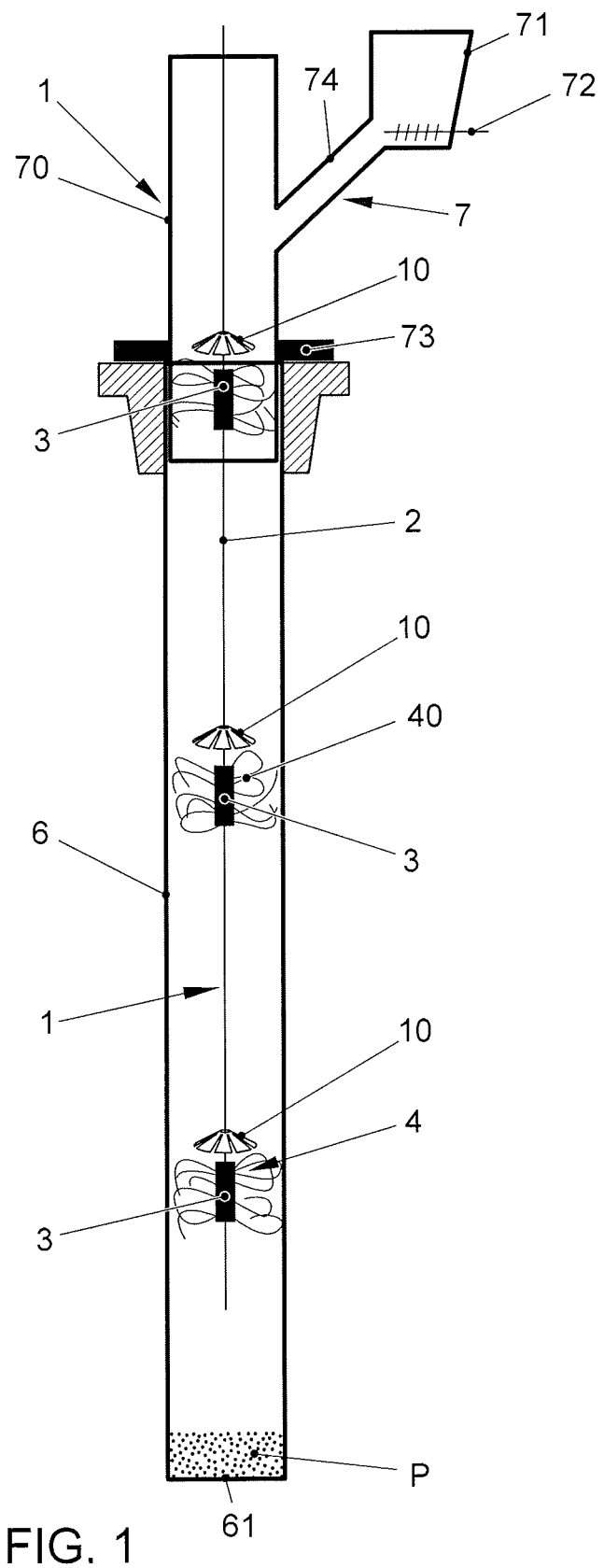
FIG. 1 shows a filling device (1) according to the invention during the filling of a vertical tube (6) with filling-material particles (P). In particular, the device (1) placed longitudinally in the tube (6) comprises three fall arrester elements (3) according to the invention which are fastened to a carrier (2). Each fall arrester element (3) carries a multiplicity of irregularly arranged, curved filamentary net elements (40), produced for example from individual pieces of steel wire. Above each fall arrester element (3), a hat- or umbrella-like filling-material deflector (10), produced for example from thin steel sheet, is fastened to the carrier (2) and configured such that it protects the central region of the net (4) formed by the net elements (40) from being struck directly by the filling-material particles (P) to be poured in from above via the filling aid (7).

MORE DETAILED DESCRIPTION OF THE INVENTION a) General Definitions

A net structure is "permeable" within the meaning of the invention when the filling-material particles do not pass through the net structure in an unimpeded manner during the filling of the tube but come into contact with at least one net element of the net structure and in this way have their falling speed reduced.

A "net structure" within the meaning of the invention should be understood as being a radial "open" or "closed" arrangement of individual, at least one (for example a metal-wire thread that is formable into individual loops), in particular at least two net elements (for example loops, zigzag fibers, curved fibers or combinations thereof) on the fall arrester element. Furthermore, a net structure according to the invention is distinguished by the fact that, in its vertical projection, i.e. in plan view of the fall arrester element(s) (or in the filling device extending along the longitudinal axis of the tube), individual, in particular at least two, net elements, such as fibers, zigzag fibers, loops or threads or combinations thereof, cross or intersect or are connected together, in particular cross or intersect. For example, such crossings or overlaps exist at the latest when the filling device has been inserted into the tube to be filled. Preferably, however, these crossings or overlaps are already formed before the fall arrester element is introduced into the tube to be filled. However, it is also possible for them to be formed after being introduced into the tube by radial pressing together of individual net elements (in particular when curved fibers are used as net elements). In an "open" arrangement, the elements are fastened to the fall arrester element on one side, i.e. with one end, (for example fibers or zigzag fibers, as described herein); in a "closed" arrangement, the net elements are fastened on both sides and individual elements additionally engage in one another if appropriate (for example loops). The net elements are additionally distributed radially and longitudinally such that the vertical (i.e. longitudinal) passage of the filling-material particles through the fall arrester element is impeded by the single or in particular multiple contact of a filling-material particle with individual net elements and thus its falling speed is gently decelerated.

"Net elements" are fibers, filaments, zigzag fibers, loops or threads that are formed in an elastic manner according to the invention. By way of a suitable radial and longitudinal arrangement of at least one net element, in particular at least two net elements, a net structure according to the invention is provided, in which the individual elements interact and exert the fall-arresting action on the filling-material particles.

"Longitudinal" denotes the direction along the longitudinal axis, in particular of a straight tube to be filled.

A "maximum radial diameter" "$d_{max}$" of a fall arrester element denotes the greatest diameter that is able to be determined, when a fall arrester element is viewed in plan view, in the direction of the longitudinal axis thereof. This is preferably less than the inside diameter "$d_i$" of the tube to be filled.

A "zigzag fiber" is synonymous for a net element formed in a zigzag manner. To this end, at least one, but preferably several, for example 2 to 20 or 3 to 10, zigzag bends are formed in a fiber or double fiber. The bends can in this case be formed in a plane or be distributed radially about the longitudinal axis of the zigzag fiber.

"Umbrella-like" is used according to the invention as a collective term for substantially radially symmetric structures with a lateral surface that drops substantially uniformly toward the outside; in particular, the term stands for "conical", "tulip-shaped", or "hemispherical" structures.

"Conical" encompasses in particular structures, formed in a conical or hollow conical manner, in the form of a lateral surface (or cone surface) of a rotationally symmetric circular cone with surface lines which extend in a straight manner from the bottom edge to the upwardly directed tip of the cone (in the form of a "Chinese hat").

However, "conical" also encompasses bulbous structures having bulbous surface lines that do not extend in a straight manner. Such umbrella-like elements are substantially in the form of a lateral surface of a rotationally symmetric circular cone, wherein the cone tip is directed upward and the surface lines extend in a curved, in particular concave manner. For example, these umbrella-like elements are configured such that, at each point of their surface lines, that angle that encloses a tangent of the surface line with the axis of the cone is between 10 and 90°, 30 and 85°, 40 and 85° or in particular 50° and 80°.

The "central region" corresponds to the, in plan view (or vertical projection), radial middle portion, which is subjected to the greatest mechanical load during the filling operation, of a fall arrester element and has about 90 to 10%, preferably 60 to 15% or particularly preferably 40 to 20% of the radial diameter ($d_{max}$) of the fall arrester element (3).

In this document, features, parameters and ranges thereof are disclosed with different degrees of preference (including general, not explicitly preferred features, parameters and ranges thereof). Unless specified otherwise, every combination of two or more such features, parameters and ranges is encompassed by the disclosure of the present description, regardless of the respective degree of preference thereof.

b) Preferred Embodiments

The present invention relates in particular to the following preferred embodiments. All combinations of features derived by reference are hereby considered to be explicitly disclosed.

The invention relates to the following particular embodiments:
1. A device (1) for filling a longitudinal, straight tube, having a substantially constant inside diameter, in particular having an inside diameter of more than 50 mm, for example 55 to 300 or 70 to 300 mm, for example with tube lengths of 1 to 20 or in particular 3 to 17 or 2 to 15 meters, with particulate filling material, in particular catalyst particles, comprising at least one elastic fall arrester element (3) that is fastened to a central carrier (2) and is introducible together with the carrier (2) into the tube to be filled, but preferably a multiplicity of (for example 2 to 10 or 3 to 5) elastic fall arrester elements (3) that are fastened in series to the carrier (2), characterized in that, above the at least one fall arrester element (3), in particular above the net structure formed on the at least one fall arrester element (3), a filling-material deflector (10) radially, in particular substantially radially symmetrically, enclosing the carrier (2) is arranged, the outside diameter of said filling-material deflector (10) being less than the inside diameter of the tube to be filled, and preferably the lateral distance between the tube inner side and the filling-material deflector (i.e. the outer edge thereof or the region thereof with a maximum diameter $d_{max}$) is dimensioned such that it allows the filling-material particles to pass through.

In particular, in this case, the at least one fall arrester element (3) carries a net structure (4) that is permeable to the filling-material particles, wherein the net structure (4) comprises a multiplicity of elastic net elements (40) and the filling-material deflector is arranged above the net structure (4).

Preferably, in this case, the filling-material deflector (10) is formed in an umbrella-like manner and protects the central region of the at least one fall arrester element (3) from being struck directly by filling-material particles during a filling operation.

In particular, the maximum diameter ($d_{max}$) (in vertical projection) of the fall arrester element (3) is greater than the maximum diameter ($d_{max}$) (in vertical projection) of the filling-material deflector (10). In particular the diameter ratio ($d_{max}$ (fall arrester element):$d_{max}$ (filling-material deflector)) is in the range from 1:0.9 to about 1:0.1, preferably 1:0.6 to 1:0.15 or particularly preferably 1:0.4 to 1:0.2.

2. The device according to embodiment 1, wherein the net structure comprises a central, preferably cylindrical body (33, 330) which carries the net elements (400, 401, 402, 404, 405, 406, 408).

In particular, the filling-material deflector (10) is wider than the body (33, 330) in terms of its maximum radial dimension ($d_{max}$).

For the optimum configuration of the diameter ratio of the fall arrester element (3) and filling-material deflector (10), care should be taken to ensure that the filling-material deflectors (10) protect the central region, which is subjected to the greatest mechanical load, of a fall arrester element (3), or the central region of the corresponding net structure (4), and in particular the inner portion of the individual net elements (400, 401, 402, 404, 405, 406, 408), via which the latter are fastened to the body (33, 330) of the fall arrester element, from being struck directly by filling-material particles, but, on the other hand, do not significantly slow down the filling rate or even cause clogging of the tubular reactor with filling material during the filling operation.

In particular, (in the vertical projection/plan view) the central region of the fall arrester element (3) or of the corresponding net structure (4) is covered by the filling-material deflector (10).

The central region extends approximately radially symmetrically about the vertical central axis of the fall arrester element (3). It comprises the central body (33, 330) and the inner portion of the net structure (4), and in particular the inner portion of the individual net elements (400, 401, 402, 404, 405, 406, 408). The central region has approximately 90 to 10%, preferably 60 to 15% or particularly preferably 40 to 20% of the radial diameter ($d_{max}$) of the fall arrester element (3), as is illustrated in more detail for example in the accompanying figures.

3. The device according to embodiment 1 or 2, wherein the filling-material deflector (10) is fastened to the carrier (2) in a movable manner, i.e. so as to be rotatable about the carrier longitudinal axis and/or laterally tiltable.

4. The device according to one of the preceding embodiments, wherein the filling-material deflector (10) has a lateral face (11) inclined in the falling direction of the filling material, in particular inclined from the tube center to the tube inner wall.

5. The device according to one of the preceding embodiments, wherein the filling-material deflector (10) is formed in one or more parts.

6. The device according to embodiment 5, wherein the filling-material deflector (10) is formed in one part, preferably in an umbrella-like manner, in particular in a conical manner (for example in the form of a Chinese hat), tulip-shaped manner, hemispherical manner or spherical manner, particular preferably in a conical manner (in the form of a Chinese hat).

7. The device according to embodiment 5, wherein the filling-material deflector (10) is formed in a multipart manner and comprises a multiplicity (for example 3 to 20 or 4 to 10) of segments or bristles, which are arranged in a radially symmetric manner with respect to an umbrella that is impermeable to filling material.

8. The device according to one of the preceding embodiments, wherein the filing-material deflector (10) is fastened in a rotatable and tiltable manner in a seat formed on the carrier (2) and as a result is spaced apart from net structures (4) arranged adjacently.

9. The device according to one of the preceding embodiments, wherein the filling-material deflector (10) has, in vertical projection, a maximum diameter $d_{max}$ which corresponds to about 5 to 50% or 5 to 30% or preferably 5 to 20%, in particular 7 to 20%, for example 7 to 15%, of the tube inside diameter ($d_I$) of the tube to be filled.

At the same time, in this case, the filling-material deflector (10) is wider than the body (33, 330) in terms of its maximum radial dimension ($d_{max}$).

10. The device according to one of the preceding embodiments, wherein the filling-material deflector (10) has, at its widest point, a radial diameter ($d_{max}$) which corresponds to about 5 to 60%, 5 to 50% or 5 to 30%, or preferably 5 to 20%, in particular 7 to 20%, for example 7 to 15% of the tube inside diameter ($d_I$) of the tube to be filled.

At the same time, the filling-material deflector (10) is wider than the body (33, 330) in its maximum radial dimension ($d_{max}$).

11. The device according to one of the preceding embodiments, wherein the filling-material deflector (10) centrally has a height ($h_{max}$) which corresponds to approximately 2 to 60% or preferably 5 to 20%, or for example 10 to 30% or 10 to 20% of the tube inside diameter ($d_I$) of the tube to be filled.

At the same time, the filling-material deflector (10) is wider than the body (33, 330) in its maximum radial dimension ($d_{max}$).

12. The device according to one of the preceding embodiments, wherein the filling-material deflector (10) is configured such that it has a ratio of $d_{max}:h_{max}$ in the range from 1:0.1 to 1:5, for example 1:0.5 to 1:2.

For example, a filling-material deflector (10) according to the invention can be configured such that it has a conical, rotationally symmetric hollow body.

For example, the filling-material deflector (10) can have a diameter ($d_{max}$) in the range from 15 to 50 mm, in particular 15 to 35 mm, preferably 20 to 30 mm, and a height ($h_{max}$) of 3 to 30 mm, in particular 5 to 15 mm or preferably 5 to 10 mm.

13. The device according to one of embodiments 2 to 12, wherein the filling-material deflector (10) is configured such that its radial diameter $d_{max}$ is greater than the radial diameter of the central, preferably cylindrical, body (33, 330).

The body may have for example a radial diameter of 5 to 30 mm, in particular 8 to 20 mm or preferably 10 to 15 mm.

At the same time, the filling-material deflector (10) is wider than the body (33, 330) in its maximum radial dimension ($d_{max}$).

14. The device according to one of the preceding embodiments, wherein the net structure (4) has a maximum radial diameter $d_{max}$ which corresponds approximately to the tube inside diameter $d_i \pm 20\%$, for example ±15, ±10 or ±5%.

15. The device according to one of the preceding embodiments, characterized in that the net structure (4) is formed from at least two elastic net elements (40), which intersect at least once in their vertical projection.

16. The device according to one of the preceding embodiments, characterized in that the net structure (4) is formed in an asymmetric manner in its vertical projection.

17. The device according to one of the preceding embodiments, characterized in that the net structure (4) is asymmetric in its lateral projection.

18. The device according to one of the preceding embodiments, characterized in that the net elements (40) are arranged on the fall arrester element (3) in a radially and longitudinally distributed manner.

19. The device according to one of the preceding embodiments, characterized in that the net elements (40) are fastened to the fall arrester element (3), in particular via spring joints (407).

20. The device according to one of the preceding embodiments, wherein the net elements (40) are configured as loops (401), the two ends of which are fastened to the fall arrester element (3).

21. The device according to embodiment 20, wherein at least two loops (401) engage in one another, and in particular one loop is passed through the other.

22. The device according to one of the preceding embodiments, characterized in that the net elements (40) are configured as radially curved fibers (400) having a free end and an end fastened to the fall arrester element (3).

23. The device according to embodiment 22, characterized in that the fibers (400) of a fall arrester element (3) have identical or different radii of curvature.

24. The device according to embodiment 22 or 23, characterized in that the fibers (400) of a fall arrester element (3) that are fastened to the fall arrester element (3) are inclined in and/or counter to the falling direction of the bulk material.

25. The device according to one of embodiments 22 to 24, characterized in that the length of the fibers (400) is greater than the tube radius.

26. The device according to one of embodiments 22 to 25, characterized in that the fibers (400) of the fall arrester element (3) have, in particular in their vertical projection, i.e. in plan view of the fall arrester element (3), an identical or opposite direction of curvature.

27. The device according to one of the preceding embodiments, characterized in that the net structure (4) is produced from stainless steel (steel wire).

28. The device according to one of the preceding embodiments, comprising one to five fall arrester elements (3) per unit of length (in particular per meter).

29. The device according to one of the preceding embodiments, wherein the fall arrester element has a length of 5 to 20 centimeters and carries 0.5 to 5 net elements (4) per centimeter.

30. The device according to one of the preceding embodiments, wherein the carrier (2) comprises spring elements (8) or is formed from a multiplicity of spring elements (8).

31. The device according to embodiment 30, wherein the spring element (8) connects two adjacent fall arrester elements (3) in a resilient manner.

32. The device according to one of the preceding embodiments, characterized in that the carrier (2) is combined with an optical monitoring device (5).

33. The device according to embodiment 32, characterized in that the optical monitoring device (5) is connected at its distal end to a lens/detector (51) and optionally to a light source (52) and at its proximal end to a monitor (53).

34. The device according to embodiment 33, wherein the monitoring device comprises a flexible light guide (50).

35. The device according to embodiment 34, wherein the light guide (50) is at the same time the carrier (2) of the fall arrester elements (3).

36. The device according to one of embodiments 33 to 35, wherein the lens (51) is arranged beneath the bottommost fall arrester element (3) of the device (1).

37. The use of a device according to one of the preceding embodiments for filling a tubular reactor with catalyst particles.

38. The use according to embodiment 37, characterized in that the tubular reactor has an inside diameter of 70 to 300 mm.

39. A method for filling a vertically arranged tube with particulate material, characterized in that the device (1) is introduced via the upper end of the tube to such an extent that the bottommost fall arrester element (3) does not touch the tube bottom, and the device is removed from the tube counter to the falling direction of the particles during filling.

40. The method according to embodiment 39, characterized in that the device is removed from the tube continuously or incrementally.

41. The method according to either of embodiments 39 and 40, characterized in that the filling operation is interrupted when the filling has taken place unevenly.

42. An optical monitoring device (5), comprising an optical light guide (50), at the input of which an optical converging lens (51) optionally together with a light source (52) is formed, and the output of which is connected to a receiver (53), wherein the device (5) additionally has fall arrester elements (3) as per the definition in one of embodiments 1 to 29.

A further particularly preferred subject of the invention relates to

43. A device (1) (as per EP-B-1 749 568), for filling a tubular reactor having a tube inside diameter of 70 to 300 mm with particulate bulk material, comprising at least one fall arrester element (3) that is fastened to a longitudinal flexible carrier (2) and is introducible together with the carrier (2) into the tube to be filled, characterized in that the fall arrester element (3) carries a net structure (4) that is permeable to the bulk-material particles, wherein the net structure (4) is formed from a multiplicity of elastic net elements (40), wherein the net elements (40) are arranged on the body (33) of the fall arrester element (3) in a radially and longitudinally distributed manner, at least two net elements (40) intersect in their vertical projection, and the fall arrester element (3) has a length of 5 to 20 centimeters and carries 0.5 to 5 net elements (40) per centimeter, wherein the total number of net elements (40) per fall arrester element (3) is 3 to 20, and wherein the net elements (40) are loops, the two ends of which are fastened to the fall arrester element (3); and wherein, above the net structure (4) of the at least one fall arrester element (3), a filling-material deflector (10) as defined herein, in particular as defined above for embodiments 1 to 13, is formed.

Furthermore, devices according to one of the above embodiments 1 to 36 and 43, having a filling-material deflector (10) which is formed as illustrated in one of FIGS. 10a, 10b, 11a to 11d, 12a or 12b, are particularly preferred.

c) Further Configurations of the Invention

Where no other details are provided, the following details apply to the further configuration of the embodiments already described above.

The subject of the invention is a device for filling a tube, preferably vertically, with particulate filling material, comprising at least one fall arrester element that is fastened to a longitudinal carrier and is introducible together with the elongate carrier into the tube to be filled, characterized in that the fall arrester element carries a flexible, in particular irregular net structure that is permeable to the filling-material particles, said net structure being formed from a multiplicity of, preferably curved, net elements, for example fibers, loops, threads, zigzag fibers, wherein preferably at least two net elements of the same fall arrester element or of two, preferably adjacent fall arrester elements intersect at least once in their vertical projection, and wherein preferably, above each fall arrester element, a filling-material deflector as described above is assigned to the latter. In particular, each fall arrester element and the associated filling-material deflector are two separate components of the device.

The filling-material deflectors described herein can be produced from different materials, for example from plastic, plastics composite material, fiber reinforced plastic, or, preferably, from metal, for example steel sheet or spring steel sheet. Typically, the wall thickness of such a material is in the range from 0.5 to 5 mm, for example 1 to 2 mm, but preferably 0.5 to 1.5 mm.

In particular, the net structure according to the invention (three-dimensional net) is configured such that, before being introduced into the tube, it has a maximum radial diameter $d_{max}$ which corresponds approximately to the tube inside diameter $d_I \pm 20\%$. For example, $d_{max}$ may be equal to $d_I + 15\%$ to $d_I - 15\%$, or $d_I + 5\%$ to $d_I - 5\%$. Usually, $d_{max} = d_I + 2\%$ to $d_I - 5\%$ or $d_I \pm 0\%$ to $d_I - 2\%$. Preferably, the net structure according to the invention (three-dimensional net) is configured such that (already before being introduced into the tube and also in the tube) it has a maximum radial diameter $d_{max}$ which is less than the tube inside diameter, for example $d_I - 20\%$. For example, $d_{max}$ may be equal to $d_I - 15\%$ or $d_I - 5\%$. Usually, $d_{max} = d_I - 5\%$ or $d_I - 2\%$. Typical tube inside diameters $d_I$ of tubes that are fillable according to the invention are in the range of more than 50 mm, for example 70 to 300 mm or 100 to 200 mm.

In a further configuration of the invention, the net structure is formed from a multiplicity of, in particular at least 2, preferably elastic and in particular curved net elements.

The manner in which individual net elements are fastened to the fall arrester element can be as desired, wherein replaceability of defective elements should preferably be ensured. Thus, it is possible for individual elements to be soldered or adhesively bonded to the body of the fall arrester element. Advantageously, it is also possible for depressions to be provided in the body, the elements being fastened in said depressions. In order to further improve the flexibility of the individual elements, the latter can have spring joints, for example produced by spirally twisting one end of a filamentary net element, and be connected, for example adhesively bonded, to the body of the fall arrester element via these spring joints.

It is also possible for the number of net elements per fall arrester element to fluctuate over a wide range. However, it is selected such that the free passage of the filling-material particles is impeded by the fall arrester element. Depending on the filling-material particle size, it is therefore possible for the suitable number of net elements to be determined by a small number of preliminary tests.

As a result of the irregular arrangement of the net elements, the fall-arresting action of the net structure can be improved further. In this case, the net structure is formed in an asymmetric manner in its vertical projection, i.e. in plan view.

Furthermore, the net structure can likewise be asymmetric in its lateral projection, i.e. in its side view.

The net elements are arranged on the fall arrester element in particular in a manner distributed radially and longitudinally (i.e. axially and in the longitudinal direction), in particular fastened releasably thereto such that it is easier to replace individual elements in the event of a defect.

In order to form a net structure according to the invention, the net elements can be present in different forms. The net elements can be formed for example as loops, the two ends of which are fastened releasably to the fall arrester element. Within a net structure, individual, for example at least two, adjacent loops can engage in one another.

According to a further embodiment of the device according to the invention, the net elements can be configured as radially curved, elastic fibers or zigzag fibers with a free end and an end fastened to the fall arrester element. In this case, the fibers of an individual fall arrester element can have identical or different radii of curvature or zigzag angles.

The net elements fastened to the fall arrester element, in particular the fibers, zigzag fibers or loops, can either be oriented vertically to the carrier or be inclined in and/or counter to the falling direction of the filling material.

A fall arrester element can also contain net elements (fibers, zigzag fibers, loops, threads) of different types in any desired combination.

The fibers, zigzag fibers or loops of a net structure can have identical or different lengths.

For example, individual fibers of a fall arrester element, in particular the majority thereof, i.e. more than 50%, for example 60, 70, 80, 90 or 100%, have a length which is greater than the tube inside radius. For example, the length thereof can be 1 to 100%, 5 to 90%, 10 to 80%, 20 to 70% or 30 to 50% greater than the tube inside radius.

For example, individual loops or zigzag fibers of a fall arrester element, in particular the minority thereof, i.e. less than 50%, for example 40, 30, 20 or 1 to 10%, have a main axis length which is greater than the tube inside radius. For example, the length thereof can be 1 to 50%, or 2 to 10% or 3 to 5% greater than the tube inside radius. Preferably, however, none of the loops or zigzag fibers of a fall arrester element have a main axis length which is greater than the tube inside radius.

The remaining part of the net elements (such as fibers, zigzag fibers and loops), preferably all of the net elements, have a length, or main axis length, which corresponds to the tube inside radius or is smaller by 1 to 50%, for example 2 to 20% or 5 to 10%.

The most suitable configuration is easy for a person skilled in the art to determine. He will take care to ensure that the introduction of the device into the tube is not rendered unnecessarily difficult and also that the fall-arresting action can be exploited optimally.

Easier introduction of the device into the tube and tautening of the carrier can for example also be achieved by fastening a suitable weight to the lower end of the carrier, said weight pulling the carriers downward into the tube.

Furthermore, it is possible for the fibers of the fall arrester element to have identical or opposite directions of curvature such that, in the case of an opposite direction of curvature, they extend in one another.

Moreover, the zigzag fibers used can be formed in a zigzag manner along their entire length or only in a portion.

The net structure according to the invention can be produced from different suitable elastic materials, for example plastic or steel. Stainless steel is particularly suitable here.

The number of net elements per fall arrester element, and the geometry of the net elements, such as length, curvature and diameter of the fibers or loops, depending on the size, weight and falling speed of the filling-material particles, can be adapted to the requirements of the tube filling to be carried out in each case. For example, a fall arrester element comprises 1 to 100, for example 3 to 50 or 5 to 20, in particular 6 to 12 or 4 to 8, net elements.

For example, the net elements (for example the steel wire used for production) can have a diameter (thickness) of 0.3 to 1.5 mm, in particular 0.4 to 0.8 or 0.5 to 0.6 mm. The diameter can in this case remain the same or vary along the overall length (for example of the loop or of the zigzag fiber). For example, the individual fall arrester elements can have a greater diameter toward the carrier and thus greater stability and less elasticity than in the region of the distal ends.

For example, per unit of length of the fall arrester element in centimeters, 0.5 to 5 net elements, for example 1, 2, 3, 4 net elements can be arranged. As a result of this relaxed arrangement of elastic net elements, in contrast to the devices used according to the prior art having a close, brush-like population of relatively rigid bristles, the risk of a particle backlog and thus of undesired clogging of the tube during filling is effectively reduced or prevented. In this way, when the device according to the invention is used, the filling rate can be increased considerably compared with the prior art.

The number and configuration of the net elements can be selected such that the pouring rate or filling capacity is improved considerably compared with conventional brushes under standard conditions. Thus, when catalyst particles having a weight of about 2 to 4 g and a diameter of about 15 to 20 mm, for example 2 g/16.1 mm or 4 g/19.6 mm, are used, a vertical tube, for example a reformer tube, for example having an inside diameter of 100 mm, can be filled according to the invention at a speed of 0.5 to 1.5, in particular 0.5 to 1.3, or 0.8 to 1.2 or 0.9 to 1.1 minutes/meter of tube in a fault-free manner and without the particles being damaged. With conventional brushes and under identical conditions, by contrast, maximum filling rates of only 1.36 to 1.81 minutes/meter are achievable.

As required, a filling device according to the invention can be equipped with a variable number of fall arrester elements. For example, a device according to the invention can carry 1 to 5, for example 2, 3 or 4, fall arrester elements per unit of length, for example per meter. The total number of elements can be for example in the range from 1 to 50 or 1 to 20, for example 2 to 15 or 5 to 10, per device. The device can particularly advantageously be constructed in a modular manner, i.e. in the event of a defect or upon wear, individual elements can be exchanged. For example, individual fall arrester elements can be connected (for example screwed) alternately to steel cables.

Each individual fall arrester element can have a length of 5 to 20, for example 8 to 12 centimeters, and carry 0.5 to 5, for example 2, 3 or 4, net elements, in particular loops, zigzag fibers or fibers, per centimeter.

As explained below, it is also possible for a fall arrester element to comprise only a single filamentary net element, however, which is connected releasably to the fall arrester element multiple times, forming loops along the latter.

According to the invention, it may also be expedient for the individual fall arrester elements likewise to have a modular structure, such that individual net elements can be replaced quickly if required. This is possible for example in that the fall arrester element is assembled from a series of, for example 2 to 10, segments that are able to be screwed together, for example sleeves or nuts with an internal thread. The net elements, for example the elastic fibers, zigzag fibers or loops, can then be inserted between two such segments with the aid of eyes formed on the fiber, the zigzag fiber, the loop or the thread, radially aligned and fixed by screwing the segments together.

The carrier according to the invention of the filling device is configured in a flexible manner and can be for example a cord, a band or a cable. Generally, the flexible body consists of braided, natural or synthetic or metal fibers. Examples of these are cables made of metal, such as steel, or nylon. Cables made of stainless steel are particularly preferred.

The carrier can have different cross sections, but preferably has a circular cross section. Typical diameters are in the range from about 2 to 10 mm, for example 3 to 8 or 3.5 to 6 mm.

A further preferred embodiment of the device is configured such that the carrier itself comprises spring elements or is formed from a multiplicity of spring elements. These spring elements may be for example spiral springs which are produced from metal, such as steel, which connect two adjacent fall arrester elements in a resilient manner. As a result, the filling operation can be carried out even more gently. The individual spring elements can be adapted to the particular requirements in terms of geometry and spring force. In particular, larger or heavier particles are particularly protected thereby.

In a further configuration, the device can comprise a multiplicity of, for example 2 to 5, serially arranged fall arrester elements, which are connected to elastic connecting means, for example spiral spring elements, and wherein, at the same time, a flexible, pliable carrier, for example a steel cable, is passed centrally through the spring elements and the fall arrester elements. In this case, the proximal fall arrester element, i.e. the fall arrester element introduced into the tube last, or an anchor not formed as a fall arrester element is fastened to the flexible carrier, while the downwardly adjoining fall arrester and spring elements are movable parallel to the carrier in a resilient manner. The central flexible carrier confers additional stability on the device.

In a further preferred embodiment of the invention, the filling device, in particular the carrier thereof, is combined with an optical or acoustic monitoring device. This makes it possible to monitor and if necessary document the filling operation and to set a substantially constant minimum spacing of the lower, distal fall arrester element from the bed and thus to set a desired free falling height of the filling-material particles.

Suitable optical monitoring devices are equipped, at the distal end, which is introduced into the tube to be filled, with an optical lens or a detector and optionally a light source or sound source and are connected, at the proximal end, to a monitor or some other control device. Furthermore, suitable monitoring devices can comprise means for recording the course of tube filling. Such monitoring devices furthermore comprise a flexible signal conductor, for example a light guide, which can also act at the same time as the carrier for fall arrester elements. The conductor can in particular also be used, instead of the central carrier, in the above-described configuration of the device according to the invention, with a multiplicity of fall arrester and spring elements which are fastened releasably thereto.

The lens or the detector of the monitoring device is preferably arranged beneath the bottommost fall arrester element of the device, such that unimpeded monitoring and optionally recording of the filling operation is allowed.

Suitable optical monitoring devices made up of a camera, light guide (reel) and recording unit, as are used for example for monitoring pipelines, are commercially available and can be equipped with one or more fall arrester elements as described above for the requirements of the present invention. For example, suitable monitoring devices are sold by the company Kummert Inspektionssysteme e.K., Gerolzhofen, Germany in various designs (for example K-35 camera, diameter of the camera head 35 mm, H-S 30 reel; diameter 6 mm). Such devices comprise, as camera, a color CCD sensor and, as light source, LEDs arranged in the camera head. The light guide is formed from plastics-coated glass-fiber cables with an outside diameter of about 5 to 8 millimeters, to which the fall arrester elements according to the invention are able to be fastened in the above-described way.

Furthermore, a device according to the invention can comprise funnel-like filling aids. These can be placed on the tube to be filled. For example, suitable filling aids comprise a tubular stub, the outside diameter of which corresponds to the inside diameter of the tube to be filled. A filling hopper can be attached laterally, into which the filling material is poured and from which it passes into the tube to be filled via the tubular stub. In addition, a conveying aid, for example a conveying screw or a conveying wheel, can be provided in the bottom of the hopper, said conveying aid conveying a constant amount of filling material into the tube.

A further subject of the invention relates to the use of a filling device as described above for filling a tubular reactor with catalyst particles.

The device according to the invention is suitable for filling different reactor types. For example, in particular reformers may be mentioned.

The device according to the invention is furthermore suitable for filling tubular reactors with catalyst particles of very different form. Thus, unsupported catalyst particles or supported catalysts, known as coated catalysts, can be processed particularly gently. The particles can be present in different geometric forms, for example in the form of balls, rings, cylinders, hollow cylinders, cubes or cuboids. Typically, the particle weight is in the range from about 1 to 10, in particular 2 to 4 grams.

In particular, the devices according to the invention are suitable for filling tubular reactors having an inside diameter of more than 50 mm, for example 70 to 300 mm.

A further subject of the invention is a method for filling a preferably vertically arranged tube with particulate material, characterized in that the device as defined above is introduced via the upper end of the tube to such an extent that the bottommost fall arrester element just does not touch the tube bottom, and the device is removed from the tube counter to the falling direction of the particles during filling. In this case, the device can be removed from the tube continuously or incrementally.

In order to make it easier to introduce the device into the tube, it may be expedient to provide a pull weight made of steel or hard rubber on the carrier at the lower end, i.e. beneath the fall arrester element introduced first. Said weight may be formed for example in a cylindrical manner and have a ratio of diameter to length of about 2:4 to 1:10, for example a length of 100 mm and a diameter of 20 to 25 mm. The weight can be for example in the range from 50 to 500 grams or 100 to 250 grams.

If the filling operation is monitored for example optically, it can be interrupted if the tube is being charged with filling material unevenly.

In a further configuration of the method according to the invention, it is possible for any abrasion, in the form of dust, of the catalyst particles that occurs to be removed from the tube by blowing in air. To this end, a compressed-air line can be introduced at the same time as the filling device, said compressed-air line blowing air onto the particle bed. Constituents in the form of dust are swirled up thereby and discharged from the tube, together with the air flow, counter to the filling direction. Suitable devices for passing in air and optionally for sucking out dust are known per se to a person skilled in the art.

A final subject of the invention relates to a filling device having an optical monitoring device, comprising an optical light guide, at the input of which an optical converging lens optionally together with a light source is formed, and the output of which is connected to a receiver, wherein the device additionally carries at least one fall arrester element as defined above.

The present invention will now be described in more detail with reference to accompanying figures that show specific nonlimiting embodiments:

d) Exemplary Embodiments

FIG. 1 shows a filling device (1) according to the invention during the filling of a tube (6) with filling-material particles (P) which are poured onto the tube bottom (61). In particular, the device (1) comprises three fall arrester elements (3) according to the invention which are fastened to a carrier (2), such as a flexible steel cable having a diameter of 2 to 8 mm, for example 3.5 to 6 mm. Each fall arrester element (3) carries a multiplicity of irregularly arranged, curved net elements (40), which form the net structure (4). Above each fall arrester element (3), a hat- or umbrella-like filling-material deflector (10) is fastened to the carrier (2) and configured such that it protects the central region of the net (4) formed by the net elements (40) from being struck directly by filling-material particles (P). Furthermore, the filling device (1) comprises a filling aid (7) inserted into the upper, open end of the tube (6), said filling aid consisting of a tubular stub (70), an encircling ruff, or flange (73), serving as a stop or support, and a hopper (71), connected above the ruff (73) to the tubular stub (70) via a feed line (74), having an inserted screw-like conveying aid (72). In a modification of this device, the carrier (2) can be replaced by a signal conductor, likewise described herein, for example a light guide (50) of an optical monitoring device, individual fall arrester elements, for example those which comprise two body halves (360, 361), described herein, that are able to be screwed together (cf. for example FIG. 8), being releasably fastened to said signal conductor.

Figure 2:
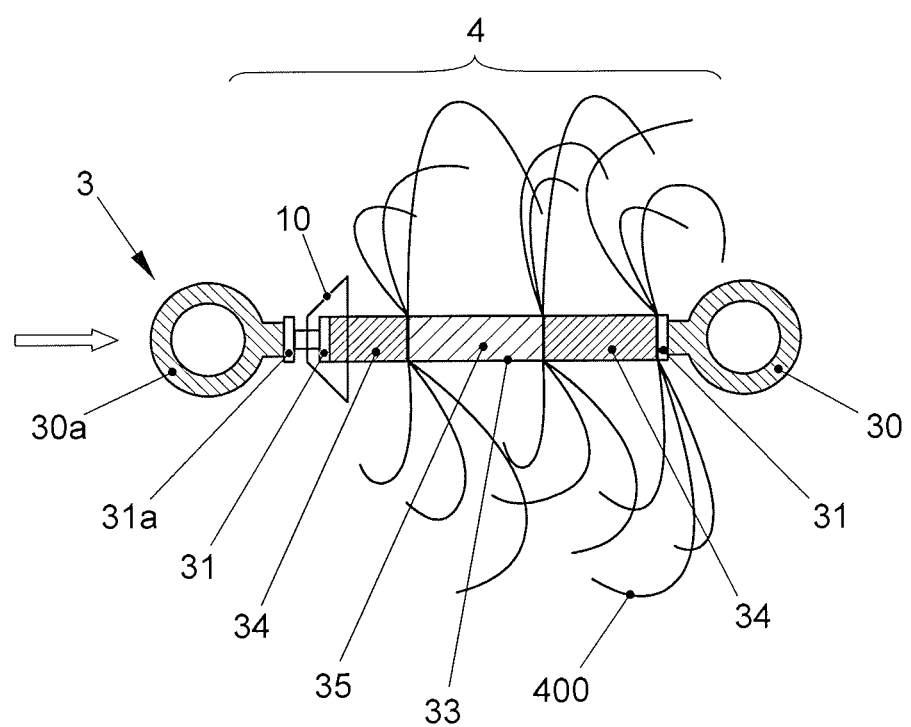
FIG. 2 shows the side view of one configuration of a fall arrester element (3) according to the invention. The fall arrester element (3) comprises two eye bolts (30, 30a) for fastening the fall arrester element (3) to the carrier (2), and a multiplicity of radially curved fibers (400), produced for example from individual pieces of steel wire. Via the stops (31) of the two eye bolts, the individual elements (34, 35) are compressed. In the intermediate space formed by the two stops (31, 31a), the upper eye bolt (30a) (on the left-hand side in the figure) carries an umbrella-like filling-material deflector (10) according to the invention (shown schematically here). The filling direction is indicated by means of an arrow.

FIG. 2 shows the side view of a horizontally illustrated fall arrester element (3) according to the invention. The fall arrester element (3) comprises two eye bolts (30, 30a) for fastening the fall arrester element (3) to the carrier (2). The eye bolts comprise a threaded neck (32) (not illustrated in FIG. 2) having an encircling ruff (31) serving as a stop. The body (33) of the fall arrester element (3) comprises three segments which are formed by two lateral sleeves (34), pushed over the threaded neck (32) of the bolts (30) as far as the stop (31) thereof, and a central coupling sleeve (35) having an internal thread. The sleeves (34) and the coupling sleeve (35) have approximately the same outside diameter. The threaded neck (32) of the bolts (30, 30a) is in this case longer than the sleeve (34), such that the external thread of the threaded bolt (32) can engage in the internal thread of the coupling sleeve (35). The coupling sleeve (35) serves to screw together the two eye bolts (30). Inserted between the stop (31) and sleeve (34) and between the sleeve (34) and coupling (35) are radially curved fibers (400) of the net structure (4), which are fixed after radial alignment by screwing together the two eye bolts (30) with the coupling (35). A plurality of such fall arrester elements can be linked in series using steel cables with the aid of conventional cable clamps. Via the stops (31) of the two eye bolts, the individual elements (34, 35) are pressed together. The upper eye bolt (30a) (on the left in the figure) carries, in the intermediate space formed by the two stops (31, 31a), an umbrella-like filling-material deflector (10) according to the invention (only illustrated in outline form), which is movable (rotatable, tiltable) about the longitudinal axis of the eye bolt (30a) and thus does not represent a rigid barrier to the filling-material particles that strike it. The filling-material deflector (10) is wider, in its maximum radial dimension, than the body (33) in its radial dimension.

In a modification (not illustrated) of the fall arrester element (3) from FIG. 2, the sleeves (34) can be replaced by a multiplicity of, for example 2 to 5, nuts that are able to be screwed together with the eye bolts, for example commercially customary hexagon nuts with an internal thread. For each eye bolt, it is possible for enough nuts to be screwed on for secure screwing together with the central coupling (35) still to be possible. In this way, the radially curved fibers are firmly screwable between two adjacent nuts.

Figure 3:
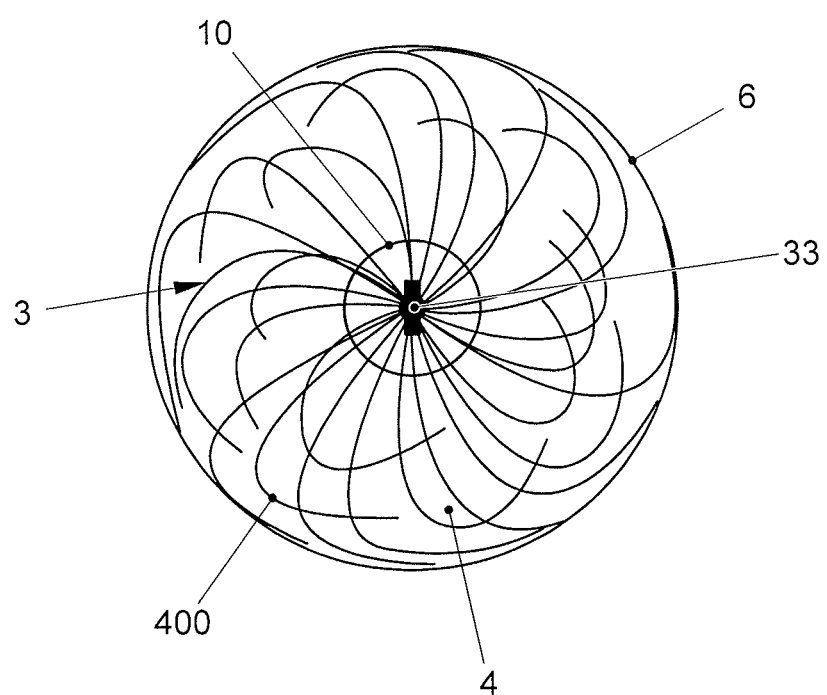
FIG. 3 shows the plan view of a fall arrester element (3) according to the invention as per FIG. 2 having radially arranged fibers (400), produced for example from individual pieces of steel wire, of different length that are curved in the same direction but to different extents, said fibers (400) forming an asymmetric open net structure (4). The substantially central arrangement of the, in the plan view, circular filling-material deflector (10) is schematically indicated.

FIG. 3 shows the plan view of a fall arrester element (3) according to the invention as per FIG. 2 having radially arranged fibers (400) of different length that are curved in the same direction but to different extents, said fibers (400) forming an asymmetric open net structure (4), the maximum radial diameter d of which corresponds to the inside diameter $d_I$ of the tube (6) to be filled (indicated as a circle). The fibers (400) are in this case arranged irregularly on the body (33) of the fall arrester element (3) in a radially distributed manner. The substantially central arrangement of the, in the plan view, circular filling-material deflector (10) is schematically indicated. The filling-material deflector (10) is wider, in its maximum radial dimension, than the body (33) in its radial dimension.

Figure 4:
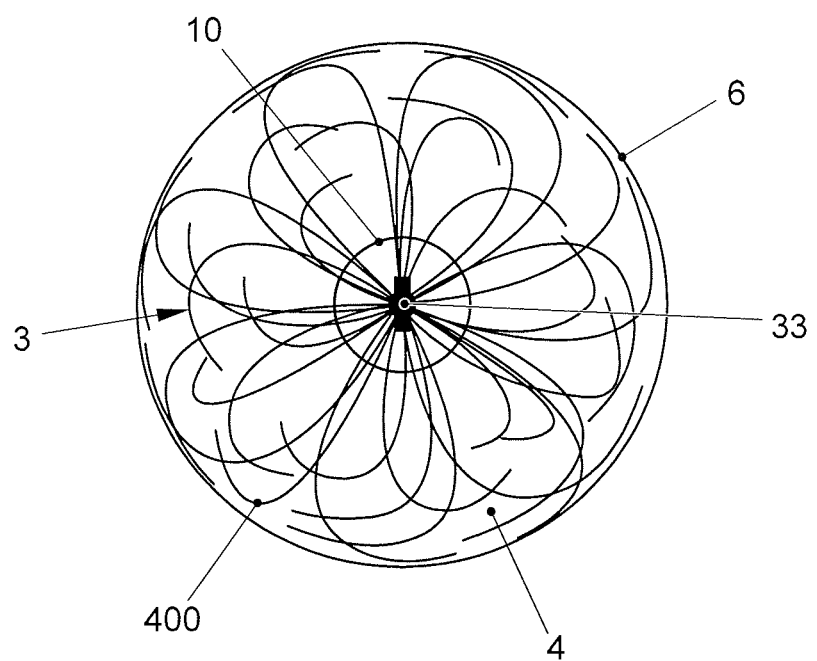
FIG. 4 shows the plan view of an alternative configuration of a fall arrester element (3) from FIG. 2 having radially arranged fibers (400), produced for example from individual pieces of steel wire, that are curved in different directions, said fibers (400) forming an asymmetric, open net structure (4). The substantially central arrangement of the, in the plan view, circular filling-material deflector (10) is schematically indicated.

FIG. 4 shows the plan view of an alternative configuration of a fall arrester element (3) from FIG. 2 having fibers (400) that are arranged radially on the body (33) and are curved in different directions and to different extents, said fibers (400) forming an asymmetric, open net structure (4). The substantially central arrangement of the, in the plan view, circular filling-material deflector (10) is schematically indicated. The filling-material deflector (10) is wider, in its maximum radial dimension, than the body (33) in its radial dimension.

Figure 5A:
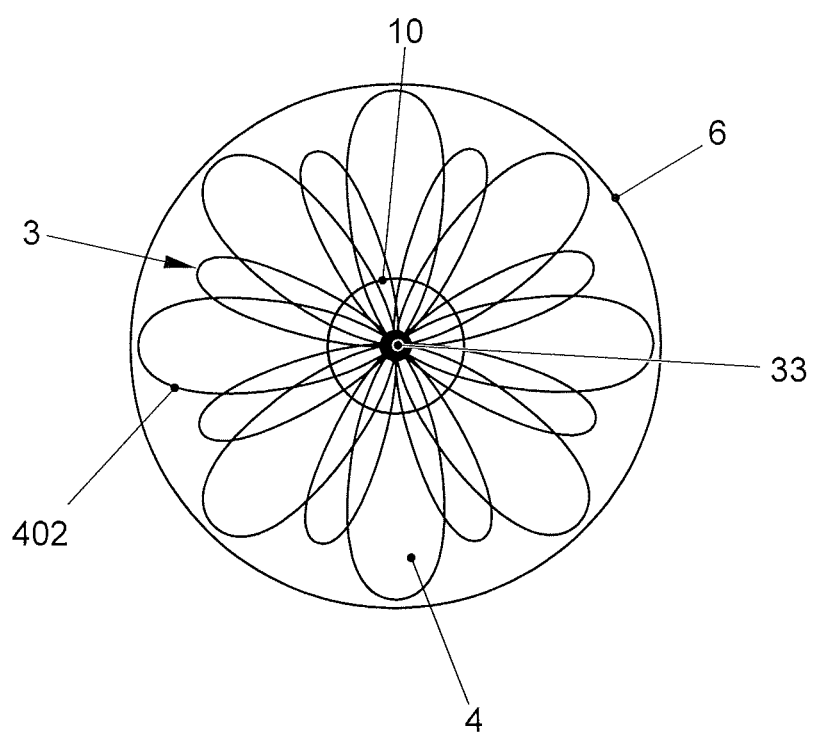
FIG. 5a shows the plan view of a further alternative configuration of a fall arrester element (3) from FIG. 2 having radially arranged loops (402), produced for example from individual pieces of steel wire, of different lengths, said loops (402) forming an asymmetric, closed net structure (4). The substantially central arrangement of the, in the plan view, circular filling-material arrester (10) is schematically indicated.
Figure 5B:
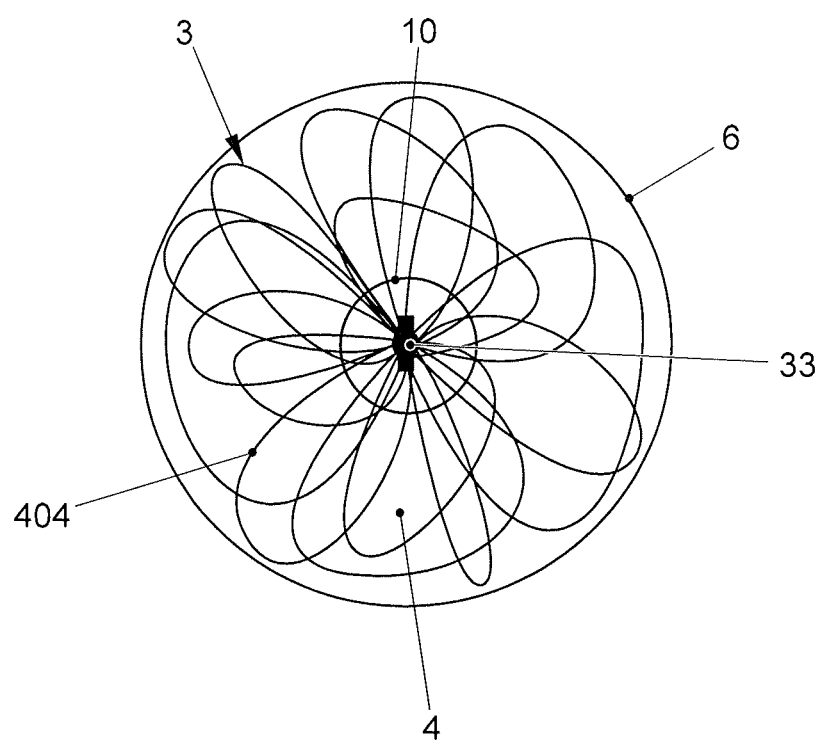
FIG. 5b shows the plan view of a further alternative configuration of a fall arrester element (3) from FIG. 5a, which is formed by a continuous elastic thread (404), produced for example from steel wire, which forms loop-like segments by being fastened sectionally to the body (33). Here too, an asymmetric, closed net structure (4) is formed. The substantially central arrangement of the, in the plan view, circular filling-material deflector (10) is schematically indicated.
Figure 6A:
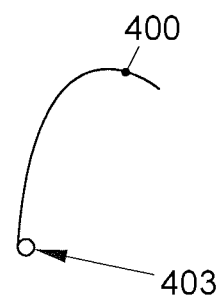
FIG. 6 shows different configurations of net elements (40) according to the invention, specifically a) as radially curved individual fibers (400), b) as radially curved S-shaped double fibers (401); c) as a loop (402), wherein these net elements are able to be fastened to the fall arrester element via a terminal eye (403)
Figure 6B:
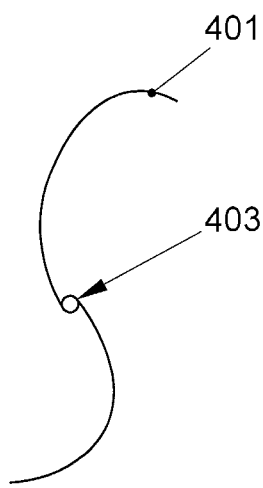
Figure 6C:
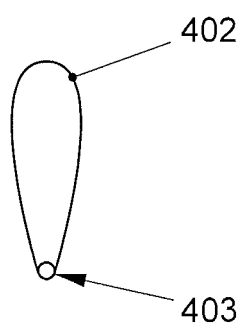
Figure 6D:
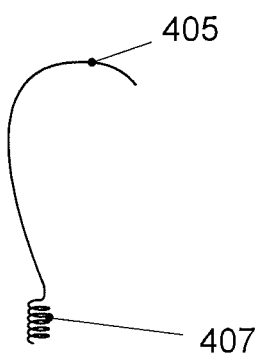
Figure 6E:
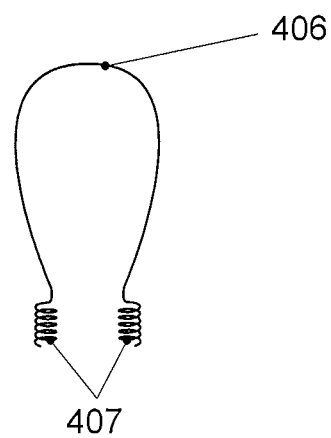
Figure 6F:
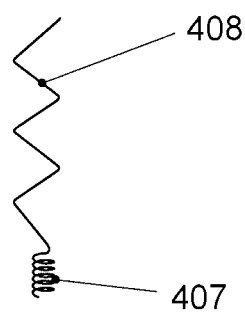

FIG. 5a shows the plan view of a further alternative configuration of a fall arrester element (3) from FIG. 2 having loops (402) of different lengths that are arranged radially on the body (33), said loops (402) forming an asymmetric, closed net structure (4). FIG. 5b shows the plan view of a further alternative configuration of a fall arrester element (3) from FIG. 5a, which is formed by a one-piece elastic thread (404) which forms loop-like segments by being fastened sectionally to the body (33), for example via eyes formed by the thread. Here too, an asymmetric, closed net structure (4) is formed. The substantially central arrangement of the, in the plan view, circular filling-material deflector (10) is schematically indicated. The filling-material deflector (10) is wider, in its maximum radial dimension, than the body (33) in its radial dimension.

FIG. 6 shows different configurations of net elements (40) according to the invention, specifically a) as radially curved individual fibers (400), b) as radially curved S-shaped double fibers (401); c) as a loop (402). Each of these net elements is formed in one piece and forms a central eye (403) which serves for fastening to the fall arrester element (3). Preferably, the threaded neck (32) of the eye bolt (30) (cf. FIG. 2) is passed through the eye (403) and the net element is fixed in the above-described manner. FIG. 6 d), e) and f) show net elements which are able to be fastened to the fall arrester element via spring joints (407), specifically d) a fiber (405), e) a loop (406) having two terminal spring joints and f) a zigzag fiber (408).

Figure 7:
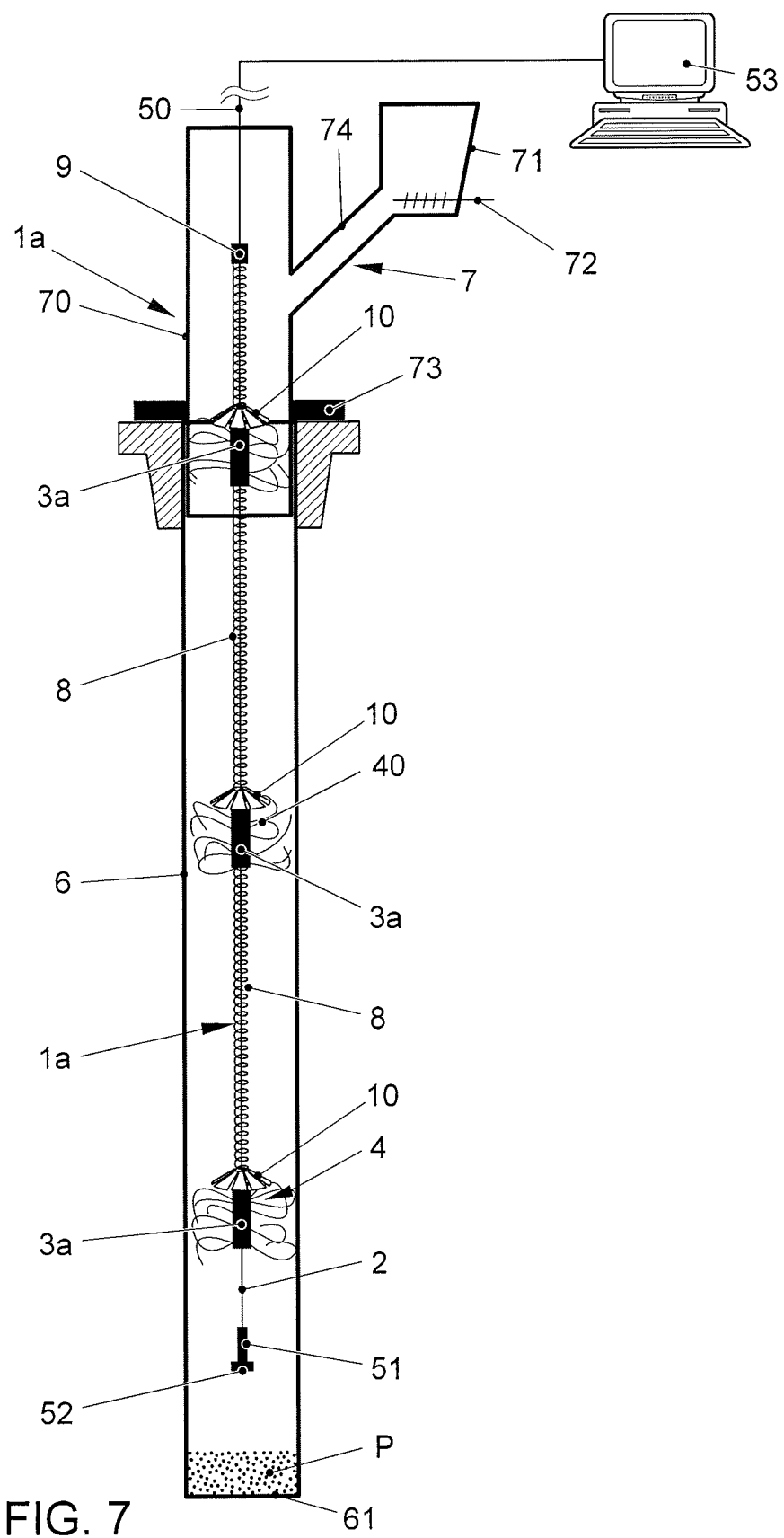
FIG. 7 shows a schematic illustration of a further configuration of a filling device (1a) inserted into a tube (6), comprising a flexible light guide (50) that is placed longitudinally in the tube (6) and serves as a carrier, said light guide (50) being connected, outside the tube (6), to a monitor (53) and being equipped at the opposite end located in the tube (6) with a light source (52) and a lens (51). The device comprises three fall arrester elements (3*a*) which are connected together in a resilient manner by spiral springs (8). Above each fall arrester element (3*a*), a hat- or umbrella-like filling-material deflector (10), produced for example from sheet steel, is configured such that it protects the central region of the net (4) formed by the net elements (40) from being struck directly by the filling-material particles (P) to be poured in from above via the filling aid (7). A modification (not illustrated here) comprises such a filling device, in which the spiral springs (8) are missing and the fall arrester elements (3*a*) and filling-material deflector (10) are fastened releasably to the light guide (50).

FIG. 7 shows a schematic illustration of a further configuration of a filling device (1a) inserted into a tube (6), comprising, in addition to the filling aid (7) already described above, a flexible light guide (50) that serves as a carrier, said light guide (50) being connected, outside the tube (6), to a monitor (53) and being equipped at the opposite end located in the tube (6) with a light source (52) and a lens (51). The device comprises three fall arrester elements (3a) which are connected together in a resilient manner by spiral springs (8). Above each fall arrester element (3a), a hat- or umbrella-like filling-material deflector (10) is configured such that it protects the central region of the net (4) formed by the net elements (40) from being struck directly by filling-material particles (P). The filling-material deflector (10) in this case encloses the upper end of the fall arrester element (3a). For example, the filling-material deflector (10) can be connected in a form-fitting manner to the upper end of the fall arrester element (3a), or be inserted in a movable (rotatable and/or tiltable) manner in an encircling recess (not illustrated) formed there. The topmost one of the fall arrester elements (3a) is connected with the aid of a further spiral spring (8) to an anchor (9) that is attached to the light guide (50) and fixed there. The fall arrester elements (3a) are configured such that they have a central bore, the inside diameter of which is greater than the outside diameter of the light guide (50). In this way, the fall arrester elements (3a) (including the associated filling-material deflector (10)) can move up and down in a resilient manner within the tube (6) parallel to the light guide (50) during the filling operation.

Figure 8A:
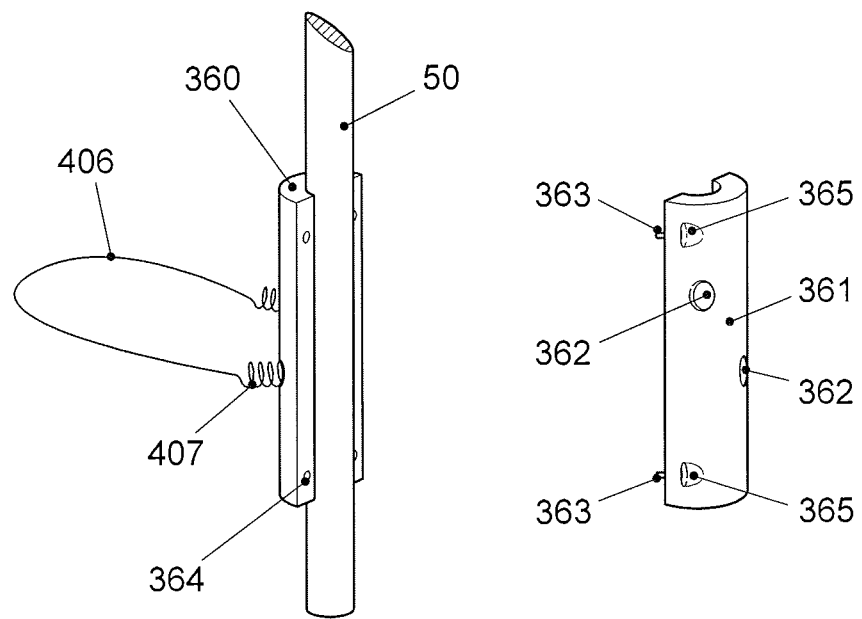
FIG. 8*a*) shows the perspective view of the arrangement before the two body halves (360, 361) are screwed together.
Figure 8B:
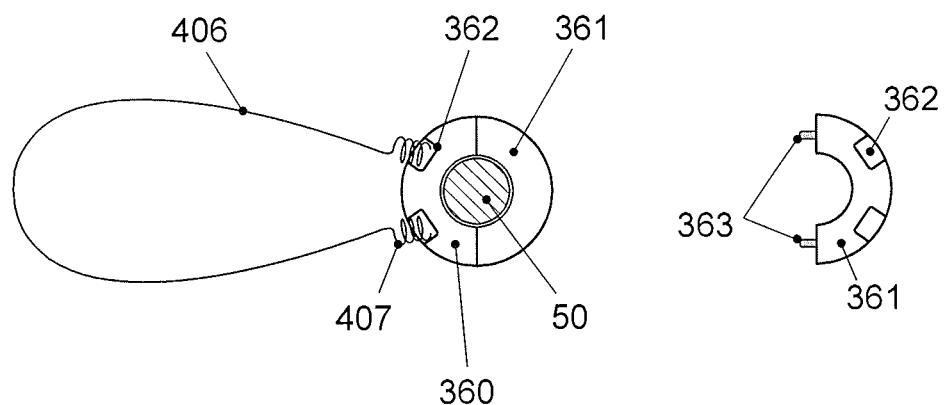
FIG. 8*b*) shows a cross section through the body screwed to the light guide (50). A filling-material deflector (10) (not shown here) according to the invention can, according to this embodiment, be arranged on the light guide (50) likewise above each fall arrester element.

FIG. 8 shows a further configuration of fall arrester elements according to the invention. The net elements, in this case loops (406) having spring joints (407), are carried by a two-part sleeve-like metal body consisting of two body halves (360, 361) that are able to be screwed together. The spring joints are in this case inserted into lateral depressions (362) that are distributed radially around the circumference of the body halves, and are for example adhesively bonded there. The inside radius of the sleeve-like body is adapted to the diameter of the carrier, in this case of the light guide (50), for example of a light guide of an optical monitoring device illustrated in FIG. 7, such that when the two body halves are screwed together, the body is fixed to the light guide (50) in a form-fitting manner. FIG. 8a) shows the perspective view of the arrangement before the two body halves (360, 361) are screwed together with the aid of bolts (363). The latter fit in bores (365) in one body half (361) and are screwed together with the threaded bores (364) in the second body half (360). FIG. 8b) shows a cross section through the screwed-together body. For reasons of clarity, only one net element (406) is illustrated. In order to form a net structure according to the invention, further net elements (406) need to be inserted into depressions (362) that are provided therefor and are distributed radially and longitudinally over the body halves, preferably such that individual net elements (406) intersect in projection (plan view). Instead of the loops (406) it is likewise possible to use other net elements, for example fibers (405) or zigzag fibers (406). A filling-material deflector (10) (not shown here) according to the invention can, according to this embodiment, be arranged on the light guide (50) likewise above each fall arrester element in that these are placed between two body elements that are fastened to the light guide (50) in series in a form-fitting manner, said body elements being formed from two halves as per body (330) but not carrying any fall-arresting loops (406).

Figure 9A:
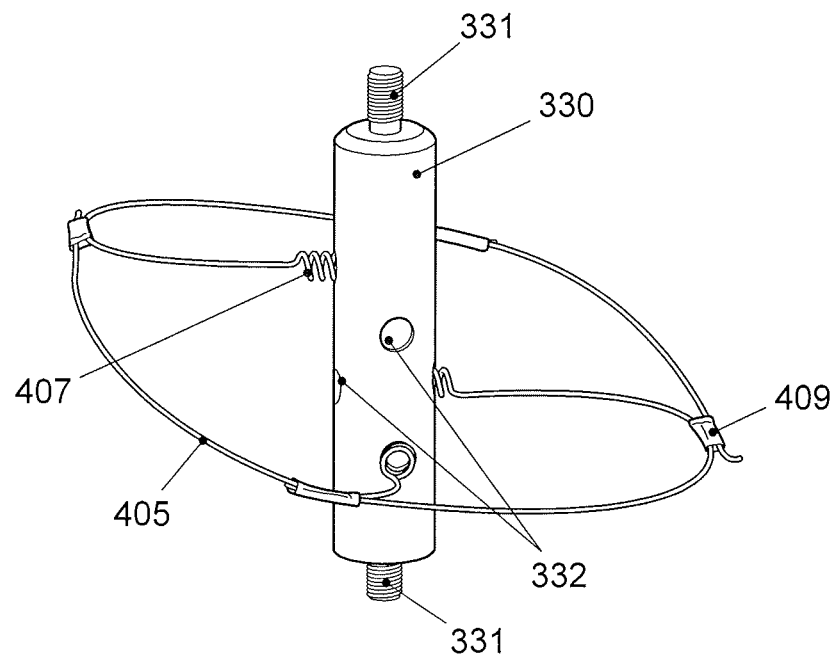
FIG. 9*a*) shows a made up of four fibers (405) that are distributed radially around the circumference of the body (330) and together form a three-dimensional net of the illustrated fall arrester element, wherein each distal fiber end is connected to an adjacent fiber (405) in the central portion thereof with the aid of a connector (409). If necessary or desired, it is possible for additional fibers to be inserted into further depressions (332) in order to configure the three-dimensional net structure in a more close-meshed manner.
Figure 9B:
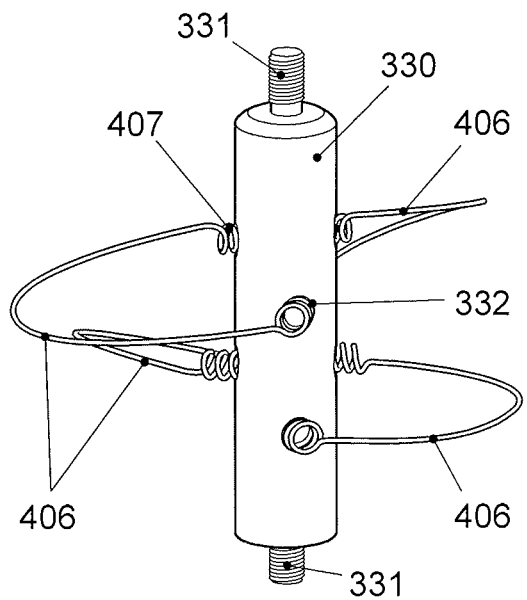
FIG. 9*b*) shows a three-dimensional net, formed from four loops (406), of the illustrated fall arrester element, wherein both ends of each of the loops are configured as spring joints (407) and have been inserted into one of a total of eight depressions (332) that are distributed radially and longitudinally on the body (330). If necessary or desired, further depressions (332) for additional loops can be formed in order to configure the three-dimensional net structure with additional loops in a more close-meshed manner.
Figure 9C:
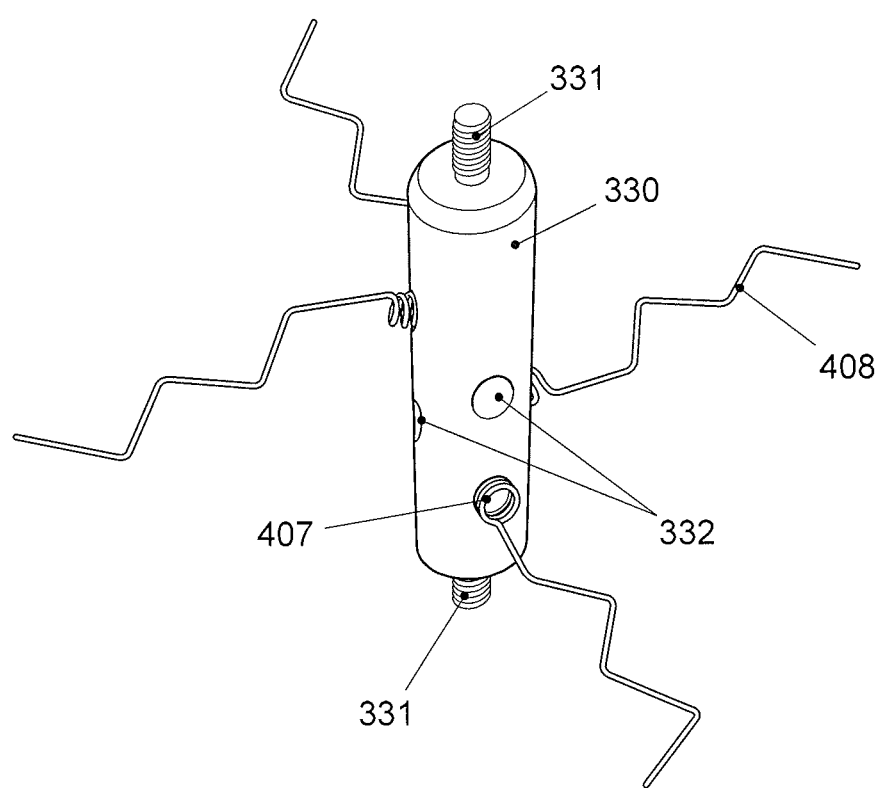
FIG. 9*c*) shows a three-dimensional net, formed from four zigzag fibers (408), of the illustrated fall arrester element, wherein each of the fibers has been inserted via a spring joint (407) into one of several depressions (332) distributed radially and longitudinally on the body (330). If necessary or desired, additional fibers can be inserted into further depressions (332) in order to configure the three-dimensional net structure in a more close-meshed manner.

FIG. 9 shows further configurations of fall arrester elements according to the invention. A one-piece metal body (330) is provided with a screw thread (331) at each of its top and bottom ends. Via this screw thread (331), it is able to be connected to the carrier (2) (not illustrated), for example a steel cable. Provided around the entire circumference of the central portion of the body (330) are a plurality of depressions (332), which are configured such that the net elements, produced for example from steel wire, are able to be fixed therein. In particular, in this case, depressions (332) are provided which can receive the spring joints (407) of different fall arrester elements. After the spring joints (407) have been inserted, they still project out of the depressions (332) to such an extent that a spring action is ensured upon loading, i.e. striking of particles during filling. FIG. 9a) shows a three-dimensional net of the illustrated fall arrester element made up of four fibers (405) that are distributed radially around the circumference of the body (330), wherein each distal fiber end is connected to an adjacent fiber (405) in the central portion thereof with the aid of a connector (409), for example a plugged-on and clamped-together metal sleeve. The net structure thus has, in plan view, an approximately circular circumference. FIG. 9b) shows a three-dimensional net, formed from four loops (406), of the illustrated fall arrester element, wherein both ends of each of the loops are configured as spring joints (407) and have been inserted into one of a total of eight depressions (332) that are distributed radially and longitudinally on the body (330). In plan view, individual loops (406) can intersect. FIG. 9c) shows a three-dimensional net, formed from four zigzag fibers (408), of the illustrated fall arrester element, wherein each of the fibers has been inserted via a spring joint (407) into one of several depressions (332) distributed radially and longitudinally on the body (330). The zigzag fibers of two adjacent fall arrester elements can in this case intersect in plan view. The fall arrester elements illustrated in FIG. 9 can, in a further modification according to the invention, be provided in a similar manner using a two-part, for example screwable body analogously to FIG. 8.

Figure 10A:
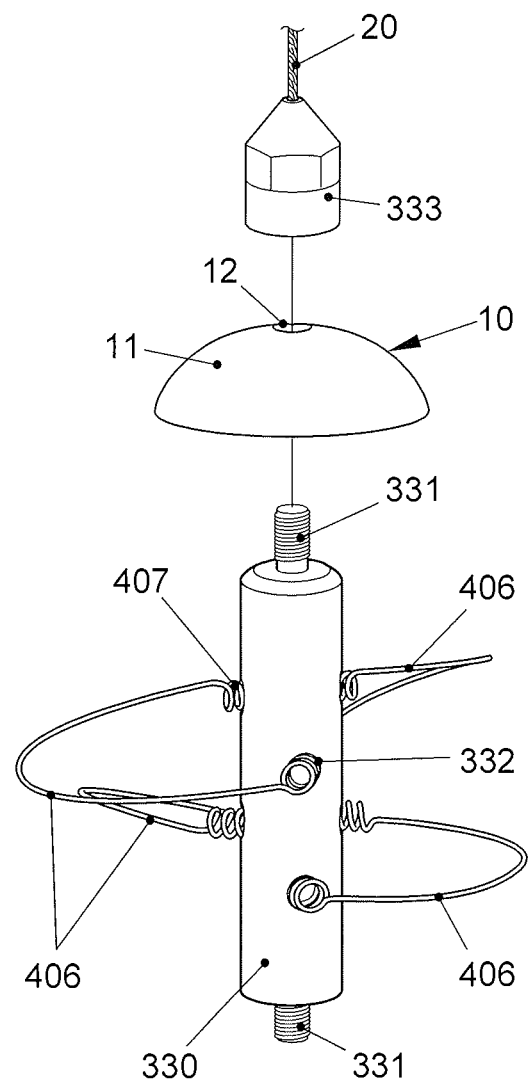
FIG. 10*a* shows a fall arrester element having a three-dimensional net formed from four loops (406) wherein the two ends of each of the loops are configured as spring joints (406) and have been inserted into one of a total of eight depressions (332) distributed radially and longitudinally on the body (330). At the two ends of the body (330), screw threads (331) are formed which serve to connect to the carrier cable (20), produced for example from a steel cable. For this purpose, screw caps (333) are fastened to the cable ends of the carrier cable (20). The screw caps (333) and body (330) have an approximately identical radial diameter. Before the device according to the invention is assembled, above each fall arrester element, the umbrella-like filling-material deflector (10) having a lateral surface (11) curved concavely in the falling direction is placed on the body (330) via the bore (12) which is formed centrally in the umbrella-like lateral surface (11) thereof, and that end of the screw thread (331) that projects through the bore (12) in the filling-material deflector (10) is screwed together with the screw cap (333).

FIG. 10a shows a three-dimensional net, formed from four loops (406), of the illustrated fall arrester element, wherein the two ends of each of the loops, produced for example from steel wire, are configured as spring joints (406) and have been inserted into one of a total of eight depressions (332) distributed radially and longitudinally on the body (330). At the two ends of the body (330), screw threads (331) are formed which serve to connect to the carrier cable (20). For this purpose, screw caps (333) are fastened to the cable ends of the carrier cable (20). The screw cap (333) and body (330) have approximately identical radial dimensions. Before the device according to the invention is assembled, above each fall arrester element, the umbrella-like, conical filling-material deflector (10), formed for example from sheet steel, is placed on the body (330) via the bore (12) which is formed centrally in the umbrella-like lateral surface (11) (concavely curved lateral surface) thereof, and that end of the screw thread (331) that projects through the bore (12) in the filling-material deflector (10) is screwed together with the screw cap (333). The filling-material deflector (10) is wider, in its maximum radial dimension, than the body (330) in its radial dimension.

Figure 10B:
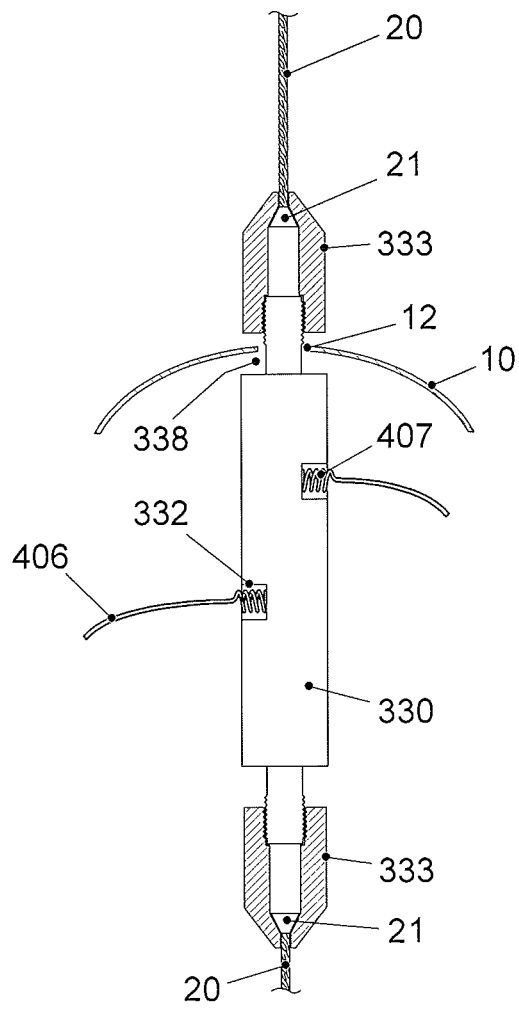
FIG. 10*b* shows a cross section through a fall arrester element according to FIG. 9*b* that is connected to a carrier (20) as per the schematic drawing in FIG. 10*a*. The cable ends (21) thickened in a frustoconical manner fit in a form-fitting manner in the screw cap (333). In the screwed-together state, the screw cap (333) and body (330) do not touch but form, in the region of the exposed threaded portion of the screw thread (331), a seat (338) for the filling-material deflector (10), said seat (338) limiting the longitudinal movability of the filling-material deflector, inserted therein, along the screw thread (331). Through a suitable choice of the height of the seat (338) and the wall thickness of the filling-material deflector (10) and also the diameter of the opening (12) in the filling-material deflector (10), the play thereof can be set as desired. In this case, it is dimensioned such that, in the installed end state, the filling-material deflector (10) remains rotatable about the longitudinal axis of the device (and about the screw thread (331)) and laterally tiltable.

FIG. 10b shows a cross section through a fall arrester element according to FIG. 9b that is connected to a carrier (20) as per the schematic drawing in FIG. 10a. The cable ends (21) thickened in a conical manner fit in a form-fitting manner in the screw cap (333). In the screwed-together state, the screw cap (333) and body (330) do not touch but form, in the region of the exposed threaded portion of the screw thread (331), a seat (338) for the filling-material deflector (10) that is concavely curved (upwardly counter to the falling direction), said seat (338) limiting the longitudinal movability of the filling-material deflector, inserted therein, along the screw thread (331). Through a suitable choice of the height of the seat (338) and the wall thickness of the filling-material deflector (10) and also the diameter of the opening (12) in the filling-material deflector (10), the play thereof can be set as desired. In this case, it is dimensioned such that, in the installed end state, the filling-material deflector (10) remains rotatable about the longitudinal axis of the device (and about the screw thread (331)) and laterally tiltable or inclinable.

Figure 10C:
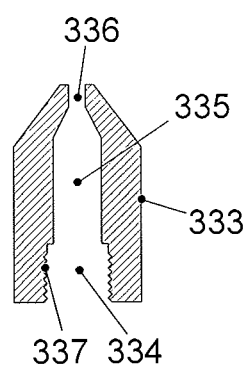
FIG. 10*c* shows a cross section through a screw cap (333) according to the invention, as is illustrated in FIG. 10*a* or 10*b*. In the lower half, the internal thread (337) corresponding to the screw thread (331) is illustrated. The recess (334) serves for screwing together in a form-fitting manner with the screw thread (331) of the fall arrester element. The recess (334) continues upward in a narrowing (335). The latter serves as a stop for the screw thread (331) and as a receptacle for the cable end (21), formed in a form-fitting manner, of the carrier cable (20), which is guided through the above bore (336) in the screw cap (333). The lengths of the screw thread (331) and of the internal thread (337) are coordinated with one another such that, when the body (330) is screwed together fully with the screw cap (333), a gap remains between the two ends of the body (330) and screw cap (333), said gap then serving as a seat (338) for the filling-material deflector (10).
Figure 11A:
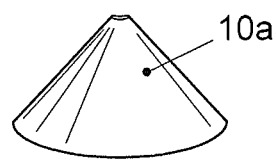
FIG. 11*a* shows an umbrella (10*a*) formed in a conical manner.
Figure 11A:
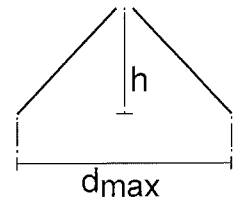
Figure 11B:
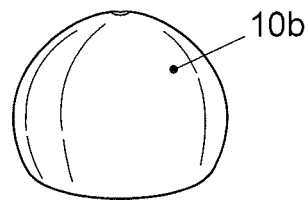
FIG. 11*b* shows an umbrella (10b) formed in a tulip-shaped manner.
Figure 11B:
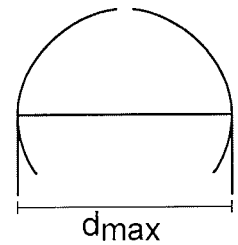
Figure 11C:
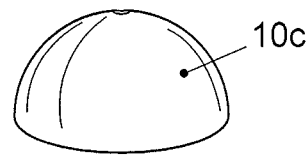
FIG. 11c shows an umbrella (10c) formed in a hemispherical manner.
Figure 11C:
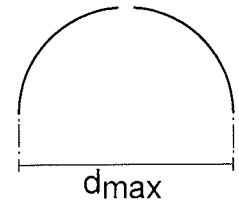
Figure 11D:
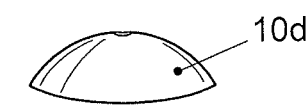
FIG. 11d shows a conical umbrella (10d) with a curved lateral surface. In the associated cross sections, the respective maximum umbrella width ($d_{max}$) and the umbrella height h (by way of example in FIG. 11a) are indicated.
Figure 11D:
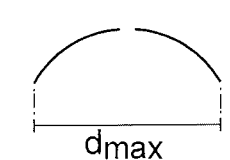

FIG. 10c shows a cross section through a screw cap (333) according to the invention, as is illustrated in FIG. 10a or 10b. In the lower half, the internal thread (337) corresponding to the screw thread (331) is formed. The recess (334) serves for screwing together in a form-fitting manner with the screw thread (331) of the fall arrester element. The recess (334) continues upward in a narrowing (335). The latter serves as a stop for the screw thread (331) and as a receptacle for the conical cable end (21), formed in a form-fitting manner, of the carrier cable (20), which is guided through the upper bore (336) in the screw cap (333). The lengths of the screw thread (331) and of the internal thread (337) are coordinated with one another such that, when the body (330) is screwed together fully with the screw cap (333), a gap remains between the two ends of the body (330) and screw cap (333), said gap then serving as a seat (338) for the filling-material deflector (10).

FIG. 11 shows different configurations of umbrella-like filling-material deflectors (10) according to the invention. Illustrated on the left in each case is a perspective, three-dimensional view, and illustrated to the right thereof is the cross section through the respective filling-material deflector. FIG. 11a shows an umbrella (10a) formed in a conical manner, FIG. 11b shows an umbrella (10b) formed in a tulip-shaped manner, FIG. 11c shows an umbrella (10c) formed in a hemispherical manner, and FIG. 11d shows a conical umbrella (10d) with a curved lateral surface. In the associated cross sections, the respective maximum umbrella width ($d_{max}$) and, for (10a) by way of example, the umbrella height h (or $h_{max}$) are indicated.

Figure 12A:
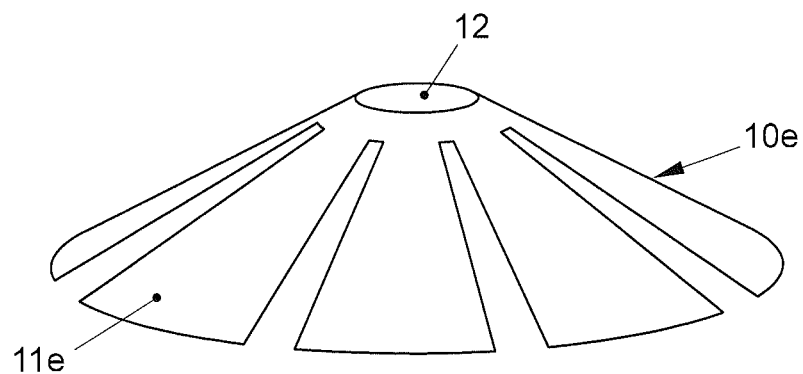
FIG. 12a shows in this case a conical umbrella (10e) which has a multiply slotted lateral surface (11e) and is thus formed in a segmented manner.
Figure 12B:
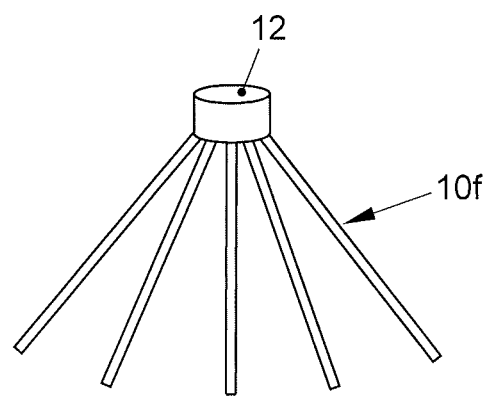

FIG. 12 shows two further configurations of filling-material deflectors (10e and 10f) that are usable according to the invention. FIG. 12a shows in this case a conical umbrella (10e) which has a multiply slotted lateral surface (11e). FIG. 12b, by contrast, shows a multipart filling-material deflector (10f) that is formed from straight bristles directed radially downward in the filling direction. The bristles are joined together at their top ends by means of a metal ring.

A person skilled in the art can provide further modifications of the specific embodiments described herein by following the technical teaching according to the invention.

Reference is made expressly to the disclosure of the documents cited herein.

The invention claimed is:

1. A device for filling a tube with particulate filling material, comprising at least one fall arrester element that is fastened to a carrier and is introducible together with the carrier into the tube to be filled; wherein the at least one fall arrester element carries a net structure that is permeable to the filling-material particles, wherein the net structure comprises a multiplicity of elastic net elements and a filling-material deflector is arranged above the net structure; and wherein the net structure comprises a central body that carries the net elements;
wherein
above the at least one fall arrester element, a filling-material deflector radially enclosing the carrier is arranged, the outside diameter of said filling-material deflector being less than the inside diameter of the tube to be filled, wherein the filling-material deflector is formed as an umbrella-like, substantially radially symmetric structure with a lateral surface that drops substantially uniformly toward outside, and protects a central region of the at least one fall arrester element from being struck directly by filling-material particles during a filling operation, wherein the central region comprises the central body and an inner portion of the net elements, via which the latter are fastened to the body;
and wherein the filling-material deflector is fastened in a rotatable and tiltable manner in a seat formed on the carrier and, as a result, is spaced apart from net structure arranged adjacently.

2. The device as claimed in claim 1, wherein the central region has 90 to 10% of the radial diameter ($d_{max}$) of the fall arrester element.

3. The device as claimed in claim 1, wherein the central region has 40 to 20% of the radial diameter ($d_{max}$) of the fall arrester element.

4. The device as claimed in claim 1, wherein the filling-material deflector has a lateral face inclined in the falling direction of the particulate filling material.

5. The device as claimed in claim 1, wherein the filling-material deflector is formed in one part.

6. The device as claimed in claim 5, wherein the filling-material deflector is formed in one part, in a conical, tulip-shaped or hemispherical manner.

7. The device as claimed in claim 1, wherein the filling-material deflector has, in vertical projection, a maximum diameter dmax which corresponds to about 5 to 50% of the tube inside diameter $d_I$ of the tube to be filled.

8. The device as claimed in claim 1, wherein the filling-material deflector is configured such that the diameter ratio ($d_{max}$ (fall arrester element):$d_{max}$ (filling-material deflector)) is in the range from 1:0.9 to about 1:0.1.

9. The device as claimed in claim 1, wherein the filling-material deflector centrally has a height $h_{max}$ which corresponds to approximately 2 to 60% of the tube inside diameter $d_I$ of the tube to be filled.

10. The device as claimed in claim 1, wherein the filling-material deflector is configured such that it has a ratio of $d_{max}:h_{max}$ in the range from 1:0.1 to 1:5.

11. The device as claimed in claim 3, wherein the filling-material deflector is configured such that its radial diameter $d_{max}$ is greater than the radial diameter of the central body.

12. A method for filling a vertically arranged tube with particulate material, wherein the device as claimed in claim 1 is introduced via the upper end of the tube to such an extent that the bottommost fall arrester element does not touch the tube bottom, and the device is removed from the tube counter to the falling direction of the particles during filling.

13. The method as claimed in claim 12, wherein a tubular reactor is filled with catalyst particles.

14. The device as claimed in claim 8, wherein the filling-material deflector is configured such that the diameter ratio ($d_{max}$ (fall arrester element):$d_{max}$ (filling-material deflector)) is in the range from 1:0.6 to 1:0.15.

15. The device as claimed in claim 8, wherein the filling-material deflector is configured such that the diameter ratio ($d_{max}$ (fall arrester element):$d_{max}$ (filling-material deflector)) is in the range from 1:0.4 to 1:0.2.

* * * * *